United States Patent
Matsumoto et al.

[11] Patent Number: 5,997,661
[45] Date of Patent: *Dec. 7, 1999

[54] ROLLING BEARING

[75] Inventors: Yoichi Matsumoto; Takashi Nagato; Kazuo Sekino, all of Kanagawa, Japan

[73] Assignee: NSK Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/903,723

[22] Filed: Jul. 31, 1997

[30] Foreign Application Priority Data

| Jul. 31, 1996 | [JP] | Japan | 8-202329 |
| Sep. 12, 1996 | [JP] | Japan | 8-242154 |
| Apr. 24, 1997 | [JP] | Japan | 9-107144 |

[51] Int. Cl.$^6$ .......................... C22C 38/16; F16C 33/62; C23C 8/22; C23C 8/32
[52] U.S. Cl. .......................... 148/316; 148/332; 148/319; 148/906; 384/492; 384/912
[58] Field of Search .................. 420/108, 112; 148/319, 332, 316, 906; 384/492, 912, 625

[56] References Cited

U.S. PATENT DOCUMENTS

| 2,639,985 | 8/1953 | Shauweeker | 75/124 |
| 4,930,909 | 6/1990 | Murakami et al. | 384/492 |
| 5,013,525 | 5/1991 | Hamada et al. | 148/906 |
| 5,137,375 | 8/1992 | Murakami et al. | 384/450 |
| 5,292,200 | 3/1994 | Matsumoto et al. | 384/492 |
| 5,338,377 | 8/1994 | Mitamura et al. | 148/906 |

FOREIGN PATENT DOCUMENTS

| 4217566 | 3/1993 | Germany . | |
| 405025609 | 2/1993 | Japan | 148/906 |
| 727139 | 1/1995 | Japan . | |
| 350752 | 6/1930 | United Kingdom . | |
| 488690 | 7/1938 | United Kingdom . | |
| 1 439 071 | 6/1976 | United Kingdom | C21D 9/40 |
| 2 200 369 | 8/1988 | United Kingdom | C22C 38/44 |

*Primary Examiner*—Deborah Yee
*Attorney, Agent, or Firm*—Sughrue, Mion, Zinn, Macpeak & Seas, PLLC

[57] ABSTRACT

A rotating shaft 4 is attached to an inner race 1, and an outer race 2 is fixed to a housing 5 so that the bearing is operated by the rotation of the rotating shaft 4. In this case, the inner race 1 is made to be the race on the rotating side, and the outer race 2 is made to be the race on the non-rotating side. The raw material composing the inner race 1, outer race 2 and rollers 3 is manufactured from alloy steel containing 4.5 weight % or less of Ni, and 0.5 weight % or less of Cu, and the average value of the Cu equivalent of the rollers 3 and the inner race 1 is set at a value higher than the Cu equivalent of the outer race 2. Thus, even in humid environments where water infiltrates into the lubricant, it is possible to make the rolling bearing have the same durable life as with rolling bearings which are used in normal environments. Accordingly, it is possible to provide rolling bearings endowed with superior durable life from the electrochemical viewpoint even when water infiltrates into the bearing lubricant.

6 Claims, 7 Drawing Sheets

ROLLING BEARING

BACKGROUND OF THE INVENTION

The present invention relates to rolling bearings which are used in environments where there is danger of water becoming mixed with the bearing lubricant. For example, this pertains to the roll neck bearings of the work rolls and backup rolls of rolling mills for steel material, guide roll bearings of continuous casting equipment for steel material, water pump bearings for automobile engines, drier roll bearings for paper-making machinery, and bearings for automobile wheels. In particular, it relates to rolling bearings endowed with superior durable life even when water seeps into the bearing.

In general, the durable life of rolling bearings decreases as moisture becomes mixed with the lubricant. For example, even when only 100 ppm of water becomes mixed with the lubricant, it is known that durable life declines by 32–48% (reference literature: Schatzberg, P. and Felsen, I. M.: Effects of water and oxygen during rolling contact lubrication, Wear, 12 (1968), pp. 331–342; and Schatzberg, P. and Felsen, I. M.: Influence of water on fatigue failure location and surface alteration during rolling-contact lubrication, Journal of Lubrication Technology, ASME Trans. F,91,2 (1969), pp. 301–307).

Accordingly, with bearings which are used in humid environments where they contact water such as roll neck bearings for rolling mills, water pump bearings, etc., conventionally, sealing countermeasures is implemented to prevent the infiltration of water into the lubricant in order to prevent any decline in durable life.

As examples of such countermeasures, there are contact and non-contact seal structures described in Japanese Patent Publication No. 55-22648, Japanese Patent Unexamined Publication No. 59-223103, etc. which disclose sealing methods for the roll neck bearings of rolling mills.

With regard to bearings which adopt the aforementioned sealing countermeasures, although sealability is improved compared to bearings which do not adopt them, and although these countermeasures help to prevent the grease (lubricant) from washing away, they are insufficient as protective measures for bearing durable life under humid environmental conditions.

That is, with regard to bearings possessing the contact seal configuration, when the temperature of the bearing declines, the air inside the bearing contracts, external moisture is absorbed into the bearing, and water becomes mixed with the lubricant. With regard to bearings possessing the non-contact seal configuration, there is a problem that water infiltrates through the crevices of the seal, and becomes mixed with the lubricant.

As stated above, since durable life is reduced by 32–48% even when only 100 ppm of moisture becomes mixed with the lubricant, there is no sealing effect relative to durable life unless the infiltration of water is completely prevented.

Conventionally, it has been unclear why water so greatly reduces the life of rolling bearings (for example, see literature: Ioannides, E. and Jacobson, B.: Dirty lubricants-reduced bearing life, Ball Bearing Journal, special '89 (1989), pp. 22–27). Consequently, there have been no life extending measures other than sealing countermeasures, and the conventional main countermeasures have exclusively been to prevent the infiltration of water by the aforementioned improvements in seal performance, but sufficiently effective countermeasures have not been obtainable.

SUMMARY OF THE PRESENT INVENTION

The present invention has been made in light of these problems, and an object thereof is to provide rolling bearings endowed with superior durable life from the electrochemical viewpoint even when water infiltrates into the bearing lubricant.

In order to solve the aforementioned problem, according to the present invention, provided is a rolling bearing where races and rolling races are respectively manufactured with raw material of alloy steel containing 4.5 weight % or less of Ni and 0.50 weight % or less of Cu, wherein the average value of the Cu equivalent of the raw material composing the rotating side races and the rolling elements is higher than the Cu equivalent in the raw material composing the non-rotating side races, when the Cu equivalent in the raw material is defined according to the following formula (1).

$$\text{Cu equivalent (\%) [Cu weight \% in the raw material]} + 0.3 \times [\text{Ni weight \% in the raw material}] \quad (1)$$

The Cu equivalent of the invention of this application uses % as its unit according to the above Formula (3), and this is explained briefly in the following explanation.

Preferably, the average value of the Cu equivalent of the raw material composing the races of the rotating side and the rotating element will be higher by 0.075 or more than the Cu equivalent of the raw material composing the races of the non-rotating side. That is, it is preferable that the sum of the Cu equivalent of the raw material composing the rotating side races and the rolling element be higher by 0.15 or more than the doubled value of the Cu equivalent of the raw material composing the non-rotating side races.

The inventors of this application have researched the influence of water on the phenomenon of fatigue in rolling bearings, and have discovered that a fatigue phenomenon in the subject rolling bearings is governed by hydrogen embrittlement accompanying the galvanic corrosion due to metallic contact between the races and the rolling elements, and that cracking and breakage (flaking) occur due to rolling when this phenomenon occurs. The inventors also discovered that the corrosion itself has no direct influence on the occurrence of this cracking. They also discovered that the principal breakage portions are in the non-rotating side races.

The present invention does not raise the corrosion resistance of the non-rotating side races which are the main breakage portions in environments where water is present. On the contrary, through an adjustment of the relative chemical component between the raw material composing the non-rotating side races and at least one of the raw materials composing the rolling element and the raw material composing the rotating side races respectively, it seeks to extend bearing life by making the Cu equivalent of the non-rotating side races relatively smaller than that of the rolling element or the rotating side races, in short, by making it electrochemically base, so that the pertinent non-rotating side races are made to entirely corrode, and the infiltration of water into the interior of the non-rotating side races is suppressed.

A detailed explanation follows.

When water becomes mixed with the lubricant, it becomes difficult to form a good oil film between the rolling elements and the races, so that metallic contact occurs between the rolling elements and the races, and the surfaces of the rolling elements and the races become chemically activated. Particularly in the maximum stress load area where the load is strongly imposed, the rolling element and the races come into a complete state of direct contact, and are in a state of marked chemical activation.

Corrosion then occurs on the portions experiencing the metallic contact via the water, and the iron in the rolling elements and the races of the contacting portions become ferric ions and are dissolved in the water. Here, it is the electrochemically base region of the contacting portions which emits the ferric ions. In steel material, there is always segregation of the elements, and there is always a base region and a noble region even when the rolling element and the races are made from the same charge and the same type of steel.

The cathode reaction and anode reaction of this galvanic corrosion (contact corrosion) is as follows.

With the anode reaction, as shown in the below formula (2), the iron is ionized in the water, and this ionized iron reacts with the water and produces hydrogen ions (corrosion reaction).

$$Fe \rightarrow F^{2+} + 2e^-$$

$$F^{2+} + 2H_2O \rightarrow Fe(OH)_2 + 2H^+ \quad (2)$$

However, the reaction of the ferric ions and the water is complex, and the product is not always $Fe(OH)_2$, but hydrogen ions are always produced.

On the other hand, with the cathode reaction, as shown in the below formula (3), the electrons produced by the aforementioned ionizing reaction of the iron react with the hydrogen ions, are absorbed into the steel as hydrogen atoms, and produce hydrogen embrittlement.

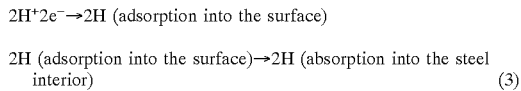

$2H^+ 2e^- \rightarrow 2H$ (adsorption into the surface)

$2H$ (adsorption into the surface) $\rightarrow 2H$ (absorption into the steel interior) \quad (3)

Here, the adsorption of the hydrogen atoms into the surface and their adsorption into the interior occurs because (1) there is no oxide film on the surface due to the metallic contact of the rolling elements and the races (adsorption acceleration) and (2) the repeated stress due to rolling widens and narrows the face spacing of the crystal lattice and accelerates the diffusion rate of the hydrogen atoms (absorption acceleration).

When hydrogen embrittlement occurs, that is, when hydrogen infiltrates into the interior of the material (steel) in an atomic state, and the unavoidable dislocation and non-metallic interposition (particularly non-metallic interposition having poor sealability with the substrate, for example, oxidic non-metallic interposition) traps the hydrogen (trapping the hydrogen in a hydrogen-molecularized, that is, gasified state in the non-metallic interposition) so as to be made brittle, cracking and then breakage occur accompanying the further progress of the corrosion reaction. In short, breakage occurs due to cracking only on the cathode reaction side. Here, the cathode reaction side is the electrochemically noble region.

Compared with the phenomenon when the bearing is stationary, the above-described phenomenon becomes conspicuous during rotation. This is because, in addition to the above two reasons (1) and (2), iron hydroxide is discharged outside the system due to bearing rotation in the anode reaction which produces iron hydroxide by corrosion reaction, with the result that the anode reaction is accelerated.

Thus, when the bearing is rotating, a remarkable hydrogen absorption reaction occurs in the vicinity of the maximum stress load area where the rolling elements and the races are in metallic contact strongly in the presence of water. The hydrogen concentration in the rolling bearing during rotation becomes highest in the vicinity of the maximum stress load area of the non-rotating side races.

This is because, in contrast to the non-rotating side races which is stationary, undergoes no change in the maximum stress load area, and absorbs hydrogen only on the raceway surface in the vicinity of its maximum stress load area whose position is fixed, since the maximum stress load portions of the rolling element and the rotating side races move due to the rotation, even if hydrogen is produced, it is apportioned and absorbed over the entire surface of the rolling element and the entire surface of the raceway, and the surface receiving the hydrogen absorption is large, with the result that the influence of hydrogen embrittlement is dispersed compared to the non-rotating side races. Accordingly, the influence of hydrogen embrittlement on the rolling elements and the rotating side races is small.

From the above, with respect to conventional rolling bearings used in humid environments where water becomes mixed with the lubricant, it was discovered that breakage (flaking) occurs mainly due to the cathode reaction on the raceway surface in the vicinity of the maximum stress load area of the non-rotating side races.

Moreover, since Ni is electrochemically more noble than iron and solidifies well in the iron substrate, steel containing Ni is more electrochemically noble than steel not containing Ni or steel containing only a little Ni. Similarly, Cu also solidifies in the steel substrate, and raises the electrochemical degree of nobility of the steel.

Thus, the invention of this application contrarily utilizes the metallic contact between the rolling element and the raceway in the presence of water. By adjusting the relative electrochemical components with the variation of the Cu equivalents, the rolling element or the rotating side raceway is made more electrochemically noble than the non-rotating side raceway. By this means, an active anode reaction is aggressively produced on the non-rotating side races and a cathode reaction is produced on the rolling elements or the rotating side races, that is, an anode reaction is produced on the non-rotating side races leading to active corrosion, while the hydrogen absorption due to the cathode reaction is dispersed over the wide receiving surface of the rolling elements and the rotating side races, thereby avoiding increases in local hydrogen concentrations. As a result, the durable life of the overall bearing is improved even in environments where water is present.

Next, the hydrogen absorption quantity ΔHab of the non-rotating side raceway is stated quantitatively in relation to the electrochemical order of the non-rotating side raceway, the rotating side raceway, and the rolling element.

Here, the electrochemical order is directed to the noble-base relations subjected to quantification, and the larger in number of the electrochemical order is, the more noble it is, as the standard electrode potential of the metal do. The electrochemical order of the non-rotating side race, the rotating side race and the rolling elements is represented by E (non-rotating), E (rotating), and E (rolling).

Here, it is assumed that the rotating side races, the rolling elements, and the non-rotating side races are connected in electrically-conductive series in this order, and that water is present in the surrounding environment, and the case of galvanic corrosion (contact corrosion) involving the contact in series of these 3 metals is considered.

When E (non-rotating)=E (rotating), for example, when the rotating side and the non-rotating side are made of the same steel material, ΔHab is simply expressed by:

$$\Delta Hab = -k \cdot \{E \text{ (rolling)} - E \text{ (non-rotating)}\}$$

where k is a proportional constant and a positive value.

However, when E (rotating), E (non-rotating), and E (rolling) are all different, it is not simple. For example, when E (rotating)>E (non-rotating)>E (rolling) (noble→base), it is clear that the rotating side raceway is cathode and the rolling element is anode, but it is not easy to know whether the non-rotating side raceway will be anode or cathode.

Thus, including this point, the inventors of the present invention studied the quantitative relations of ΔHab and E (non-rotating), E (rotating), E (rolling).

As a result, it was found that ΔHab is given by the following formula.

$$\Delta Hab = -k \cdot [\{E \text{ (rotating)} - E \text{ (non-rotating)}\} + \{E \text{ (rolling)} - E \text{ (non-rotating)}\}]$$

where k is a proportional constant and a positive value.

From this, it is clear that ΔHab<0 must be established in order to make the non-rotating side races to be anode, that is, the following conditions must be established:

$$E(\text{non-rotating}) < \frac{E(\text{rotating}) + E(\text{rolling})}{2}$$

Semantically expressed, if the electrochemical order of the non-rotating side raceway is lower (if it is more base) than the average value of the electrochemical orders of the rotating side raceway and the rolling element, the non-rotating side raceway will be anode.

Next, the reasons for the numerical limits, etc., are explained.

Cu and Ni solid-dissolve in the steel substrate to raise the electrochemical nobility of the steel as described above. Being electrochemically more noble than Ni and Cu dissolves more in the substrate, and therefore Cu is more effective than Ni in raising the electrochemical nobility.

According to the research of these inventors, Ni is approximately 30% as effective as Cu in raising nobility. For this reason, as parameters for the electrochemical order of the steel, the Cu equivalent was defined as [Cu weight %]+0.3×[Ni weight %]. The aforementioned electrochemical order E and the Cu equivalent are in the relation of a direct proportion.

That is, theoretically, if the steel were homogeneous with respect to chemical components, and if the sum of the Cu equivalents of the rolling elements and the rotating side races were relatively higher than the doubled value of the Cu equivalent of the non-rotating side races, it should be able to prevent a rise in the hydrogen concentration in the non-rotating side races, but in practice there is danger of variation due to segregation of the Ni, Cu, etc.

When a study was made by experimentation of the relation of the difference ($\Delta CU_{eq.max}$) between the sum of the Cu equivalents of the rolling elements and the rotating side races and the doubled value of the Cu equivalent of the non-rotating side races, with the rise in the value of the hydrogen concentration in the maximum stress load area of the non-rotating side races, it was confirmed that as the sum of the Cu equivalents of the rolling elements and the rotating side races becomes higher than the doubled value of the Cu equivalent of the non-rotating side races, the occurrence of hydrogen absorption in the non-rotating side races becomes more difficult, in short, the operation and effect of the present invention is demonstrated, and that when the difference of the Cu equivalents ($Cu_{eq.max}$) becomes 0.15 or more, the hydrogen absorption in the non-rotating side races is stopped.

Accordingly, it is preferable to set the sum of the Cu equivalents of the raw material composing the rotating side races and the rolling elements at a value higher, by 0.15 or more, than the doubled value of the Cu equivalent of the raw material composing the non-rotating side raceway. In short, by setting this difference in Cu equivalents ($\Delta Cu_{eq.max}$) at 0.15 or more, even in the case where water becomes mixed with the lubricant, it is possible to-obtain the same durable life as with ordinary rolling bearings where water is not present in the lubricant.

Here, since the maximum value of the Cu equivalent from the range of possible contents of Cu and Ni is 1.85, the aforementioned difference in Cu equivalents never exceeds 3.70.

The reason why the Ni content is set at 4.5 weight % or less is that, if it exceeds 4.5 weight %, the hardness becomes less than the HRC 58 which is hardness required for bearings (using steel).

The reason why the Cu content is set at 0.50 weight % or less is that, if it exceeds 0.50 weight %, there is a reduction in hot workability.

Moreover, it is preferable to have the raw material contain Cr, Mo, and Mn. In this case, it is best to set Cr at 3.5 weight % or less, Mo at 1.5 weight % or less, and Mn at 1.5 weight % or less.

That is, when Cr exceeds 3.5 weight %, a fine iron oxide film containing Cr is generated on the surface, with the result that the occurrence of partial iron oxide film breakage on the rolling surface becomes possible. Accordingly, since it is possible that this will accelerate local corrosion, it is preferable to keep Cr at 3.5 weight % or less. When Mo exceeds 1.5 weight %, abnormal texture is produced due to segregation which leads to cracking during manufacture, and it is therefore preferable to have Mo at 1.5 weight % or less. With regard to Mn as well, when 1.5 weight % is exceeded, abnormal texture is produced due to segregation which leads to cracking during manufacture, and it is therefore preferable to have Mo at 1.5 weight % or less.

In this instance, Mo electrochemically raises the nobility of the raw material while Cr electrochemically reduces the nobility of the raw material, but both the Mo and Cr facilitate the formation of carbides, and when used within the aforementioned content ranges, their effect on the Cu equivalents can be treated as negligible. The increase of Mn electrochemically reduces the nobility of the raw material and moves the entirety of the steel toward the corrosion side if uniformly distributed. Mn tends to cause segregation in the steel and particularly reduction in concentration in the substrate around the MnS interposition, and it actually engenders local corrosion, so that it is limited to the aforementioned content range. In this content range of Mn, the effect of Mn on the Cu equivalents can be treated as negligible.

With regard to the carbon concentration of the raw material, when 1.1 weight % is exceeded, giant carbides of primary crystal are produced and rolling fatigue strength is reduced, and it is therefore preferable to keep the carbon concentration in the raw material at 1.1 weight % or less.

In this instance, it is preferable to keep the carbon concentration of the raw material composing the non-rotating side raceway at 0.35 weight % or less. Since compressive residual stress in the amount of 50 MPa or more is produced on the raceway surface of the non-rotating side raceway that undergoes carburizing or carbonitriding, if we tentatively term the breakage due to hydrogen absorption as hydrogen embrittlement flaking, hydrogen embrittlement flaking resistance is improved, and it is possible to reduce from 0.15 to 0.10 the critical value of the aforementioned difference in Cu equivalents ($\Delta Cu_{eq.max}$) which is able to obtain the same life value as in the case where water does not mix with the lubricant.

It is also preferable to set the oxygen concentration of the raw material at 15 ppm or less.

As stated above, when the aforementioned difference in Cu equivalents is larger than 0 and less than 0.15, some degree of hydrogen embrittlement-may occur also on the non-rotating side raceway, and it is therefore necessary to provide resistance against this embrittlement. Hydrogen embrittlement is a phenomenon that occurs when the hydrogen atoms gasify mainly in the air gaps of the boundaries between the oxidic non-metallic interposition and the substrate, easily leading to cracking due to the rise in pressure, and to the occurrence of early breakage. Consequently, reduction of the size and amount of the oxidic non-metallic interposition is an effective countermeasure, and it is therefore preferable to keep the oxygen concentration in the raw material composing the non-rotating side raceway at 15 ppm or less. When the aforementioned difference in Cu equivalents ($\Delta Cu_{eq.max}$) becomes greater than 1.5, some degree of hydrogen embrittlement may occur even on the rotating side raceway and the rolling element, and it is therefore necessary to provide resistance against this embrittlement. Accordingly, for the same reason mentioned above, it is preferable to keep the oxygen concentration in the raw material composing the rotating side raceway and the rolling element at 15 ppm or less. For the above reasons, it is preferable to keep the oxygen concentration of the raw material composing the raceways and the rolling element at 15 ppm or less.

Moreover, in this instance, it is further preferable to keep the oxygen concentration of the non-rotating side raceway at 9 ppm or less. When kept at 9 ppm or less, it is possible to reduce the size and amount of the interposition where the hydrogen atoms gasify and which is the place of origin of the hydrogen embrittlement flaking, and hydrogen embrittlement flaking resistance is therefore improved. As a result, it is possible to reduce, from 0.15 to 0.10, the critical value of the aforementioned difference in Cu equivalents which is able to obtain the same life value as in the case where water does not mix with the lubricant.

Furthermore, when the oxygen concentration of the non-rotating side races is kept at 9 ppm or less and the carbon concentration is kept at 0.35% or less, as a result of the multiplier effect of these two, it is possible to reduce, from 0.15 to 0.05, the critical value of the aforementioned difference in Cu equivalents which is able to obtain the same life value as in the case where water does not mix with the lubricant.

Furthermore, from the relative relation between the retained austenite concentration on the raceway surface of the two races and the retained austenite concentration on the rolling surfaces of the rolling elements, when the difference in retained austenite concentrations ($\Delta \gamma_{R.max}$) shown by the below formula is set at a value larger than 0, preferably to be 3 or more, the durable life of the bearing is improved with greater surety.

$\Delta \gamma_{R.max}$ = (retained austenite concentration on raceway surfaces of rotating side races) +

(retained austenite concentration on rolling surfaces of rolling elements) − 2 ×

(retained austenite concentration on raceway surfaces of non-rotating side races)

Accordingly, in consideration of the above-stated operation, under conditions where water becomes mixed with the lubricant, it is preferable to have the difference in Cu equivalents ($\Delta Cu_{eq.max}$) at 0.15 or more, and $\Delta \gamma_{R.max}$ at 3 or more.

Here, the maximum value of the difference in Cu equivalents ($\Delta CU_{eq.max}$) is 3.70. As explained below, since it is necessary for the retained austenite concentration of the raceway surfaces and the rolling surfaces to be in the range of 5–45 volume %, the maximum value of $\Delta \gamma_{R.max}$ becomes 45+45−2×5=80.

When the retained austenite concentration of the race surfaces and the rolling surface becomes less than 5 volume %, there is a remarkable decline in life in the case where impurities such as iron powder, etc., become mixed with the lubricant. When the retained austenite concentration of the raceway surfaces and the rolling surface exceeds 45 volume %, the hardness falls beneath the required hardness HRC 58. Therefore, as stated above, it is necessary to set the retained austenite concentration-of the raceway surfaces and the rolling surface at 5–45 volume %.

Accordingly, the preferred ranges for the present invention are 0.15–3.70 for the difference in Cu equivalents, and 3–80 for $\Delta \gamma_{R.max}$.

Furthermore, when it is considered that the rotating side races normally rotate intermittently during actual use, it is preferable to have the Cu equivalent of the non-rotating side races at 0.18 or more.

That is, it is preferable to have the difference in Cu equivalents $\geq 0.15$, $\Delta \gamma_{R.max} \geq 3$, and Cu equivalent for the non-rotating side races $\geq 0.18$.

With regard to the normal rolling fatigue that occurs in rolling bearings in environments where water does not become mixed with the lubricant, since there occurs neither embrittlement nor cracking of the material (steel) due to hydrogen in the manner described above, the chemical component of the raceways and the rolling element in conventional rolling bearings has been determined mainly from the reinforcement of hardenability, hardening, or ordinary rolling fatigue, and no consideration has been given to differences in the relative chemical components of the two races and the rolling elements. For this reason, conventionally, for example, in the roll neck bearings used in the work rolls and back-up rolls of steel rolling mills, the races, that is, both the inner and outer races, require the same or higher hardenability compared to the rolling elements. Consequently, with respect to the concentration of Ni which is the element improving hardenability, the Ni concentration of the raceway side is made the same as or higher than the Ni concentration of the rolling element. On the other hand, Cu has been treated as an impurity having no relation to hardenability and which should be reduced as much as possible, and conventionally, there has been no consideration of relative tolerances between the races and the rolling elements.

Accordingly, in the case where the conventional roll neck bearings for steel rolling mills are used in humid environments where water becomes mixed with the lubricant, when the contents of the Ni in the rolling elements and the races are equal to each other, galvanic corrosion (contact corrosion) occurs due to the segregation of Ni in the metal contacting portions between the rolling elements and the races, and the hydrogen ions in the moisture are absorbed in place of the hydrogen atoms in the electrochemically noble portions of the raceway surfaces of the races and in the electrochemically noble portions of the rolling surfaces of the rolling elements, so that the hydrogen absorbing surface breaks (peels) due to hydrogen embrittlement in the constantly fixed non-rotating side races. When the races have Ni more than the rolling elements, on the contrary, the electrons generated in the contact portions between the rolling elements and the races by the dominant corrosion reaction (the ionization of iron) in the rolling elements which are electrochemically more base than the races react with the hydrogen ions in the water on the raceway surface of the races, causing a hydrogen embrittlement induced breakage (flaking) of the non-rotating side raceway whose hydrogen absorbing surface is constantly fixed. Of course, the latter has a shorter life.

Moreover, with regard to conventional bearings used in the guide rolls of continuous casting equipment for steel material, automobile wheels, the water pumps of automobiles, and the drier rolls of paper-making machines, or the like, the races are manufactured from steel with the same degree of hardenability as the rolling elements, they similarly experience breakage (flaking) on the non-rotating side races.

In order to prevent or retard this hydrogen embrittlement flaking which is the breakage due to hydrogen absorption by improving each of the separate materials of the bearing parts, it is considered that (1) corrosion is suppressed by reducing the amount of the produced hydrogen itself, and (2) a film that is difficult for hydrogen to penetrate is formed on the surfaces of the non-rotating side races to thereby suppress hydrogen infiltration into the interior.

However, as stated above, since countermeasures involving the sealing of bearings for purposes of suppressing corrosion have low effectiveness, in order to obtain the effects of the aforementioned (1) and (2) from the viewpoint of material science, it is considered first to use stainless steel. However, since the lubrication of rolling bearings used under humid lubrication conditions is deficient, the passive film on the stainless steel surface undergoes local destruction due to the metallic contact between the rolling elements and the races, this portion alone corrodes and forms corrosion pits, and breakage (flaking) occurs from this point of origin, with the result that effectiveness is low. Moreover, with stainless steel, since the material cost and manufacturing costs such as heat treatment cost are higher compared to low alloy steel, its practical application is difficult. Next, as the second-best approach for purposes of obtaining the effect of (1), it is considered to use steel containing Cu, or steel containing Cu and P (for example, JIS G3114, 3125), but this has low effectiveness, because the suppression of the corrosion of (1) is insufficient.

DETAILED DESCRIPTION OF PREFERRED EMBODIMENTS

Figure 1:
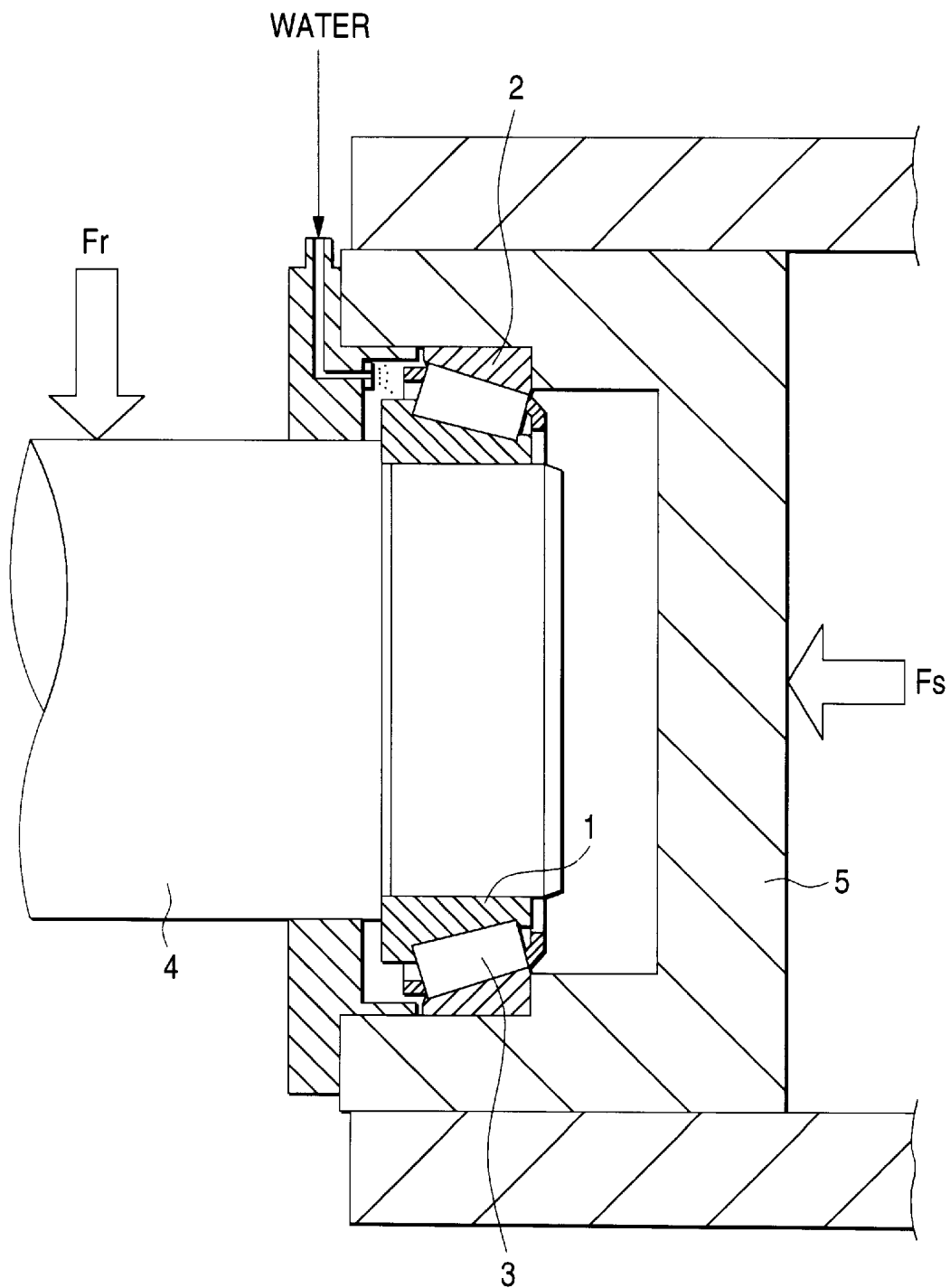
FIG. 1 shows the configuration of the bearings and their life tester according to the first embodiment of the present invention.

Next, the preferred embodiment according to the present invention is explained.

For example, taper-roller bearings which are rolling bearings are configured by interposing a plurality of rollers 3 which are the rolling elements between the inner race 1 and outer race 2 which are the raceways (see FIG. 1 which will be described later).

Then, for example, the rotating shaft 4 is attached to the inner race 1, the outer race 2 is fixed to the housing 5, and the bearing is operated by rotating the rotating shaft 4.

In this case, the inner race 1 becomes the raceway of the rotating side, and the outer race 2 becomes the raceway of the non-rotating side.

The raw material composing the inner race 1, outer race 2 and roller 3 is manufactured from alloy steel containing 4.5 weight % or less of Ni, and 0.5 weight % or less of Cu, and the sum of the Cu equivalents of the roller 3 and the inner race 1 is set at a value higher than the doubled value of the Cu equivalent of the outer race 2. Here, the Ni concentration and Cu concentration of the outer race 2 may be zero, but at least either one of the inner race 1 and roller 3 must necessarily contain Ni or Cu.

For example, if the Ni concentration of the raw material is set at the same value in each case, the present invention can be carried out by setting the Cu content of the raw material composing the rollers 3 at 0.25 weight %, and the Cu content of the inner race 1 and outer race 2 at 0.08 weight %.

Thus, the aim is to invert the conventional conception. With regard to the Cu equivalent converted into Cu content, by setting the sum of the Cu equivalents of the rollers 3 and the inner race 1 at a value higher than the doubled value of the Cu equivalent of the outer race 2 which is the non-rotating side race, even in humid environments where water infiltrates into the lubricant, it is possible to have the same durable life as with rolling bearings which are used in normal environments, that is, in environments where water does not become mixed with the lubricant.

In the above description, the explanation was made with reference to roller bearings, but ball bearings may be also acceptable.

Moreover, in the foregoing explanation, the explanation was made with reference to a bearing where the inner race 1 side rotates, but a configuration where the outer race 2 side rotates may be also acceptable. In this case, the outer race 2 becomes the raceway of the rotating side, and the inner race 1 becomes the raceway of the non-rotating side.

Embodiments

Next, a first embodiment is explained.

In practice, several conical bearings were manufactured with various changes to the Cu concentration, Ni concentration, etc., of the raw material (steel) composing each race (outer race 2 and inner race 1) and the rolling elements (rollers 3), and life tests were conducted. The Cu concentration, Ni concentration, etc., of each bearing are shown in the below-mentioned Table 1, Table 2 and Table 3.

The various elements of the conical bearing are as follows.

designation: HR32017XJ inner diameter of bearing: 85 mm outer diameter of bearing: 130 mm assembly width: 29 mm basic dynamic load rating: 143000N Among the two raceways, the inner race 1 is made the raceway of the rotating side, and the outer race 2 is made the raceway of the non-rotating side.

The life tests were conducted according to the following conditions using the life tester shown in FIG. 1. In short, the outer race 2 is fixed to the housing 5, and the rotating shaft 4 which is fit into the inner race 1 is rotated at high speed under the below-mentioned lubricating conditions.

The various elements are as follows.

radial load Fr: 35750N axial load Fs: 15680N inner race rotational frequency: 1500 rpm lubrication: pure grease lubricant or water-mixed grease lubricant grease amount when using pure grease lubricant: 60 g grease amount when using water-mixed grease lubricant: 60 g, amount of water-mixture: 10 cc/hour The water is sprayed onto the bearing in a mist together with air.

The results of the life tests conducted under the above conditions are shown in the below Table 1, Table 2 and Table 3.

Table 1 is for bearings manufactured for purposes of comparison; Table 2 and Table 3 are for bearings manufactured based on the present invention of this application.

TABLE 1

| Bearing No. | Element | Composition of Raw Material (wt %) | | | | | | | | | | | |
|---|---|---|---|---|---|---|---|---|---|---|---|---|---|
| | | C | Si | Mn | P | S | Ni | Cr | Mo | Cu | Al | N | O |
| Comparative Bearing B | Outer Race | 0.95 | 0.24 | 0.43 | 0.024 | 0.001 | 0.16 | 1.38 | 0.01 | 0.30 | 0.030 | 0.006 | 0.0008 |
| | Inner Race | 0.95 | 0.24 | 0.43 | 0.024 | 0.001 | 0.16 | 1.38 | 0.01 | 0.30 | 0.030 | 0.006 | 0.0008 |
| | Roller | 1.03 | 0.28 | 0.39 | 0.016 | 0.008 | 0.01 | 1.34 | 0.01 | 0.04 | 0.032 | 0.008 | 0.0011 |
| Comparative Bearing C | Outer Race | 0.10 | 0.24 | 0.49 | 0.018 | 0.003 | 4.50 | 1.04 | 1.50 | 0.17 | 0.035 | 0.010 | 0.0015 |
| | Inner Race | 0.10 | 0.24 | 0.49 | 0.018 | 0.003 | 4.50 | 1.04 | 1.50 | 0.17 | 0.035 | 0.010 | 0.0015 |
| | Roller | 0.10 | 0.25 | 1.50 | 0.015 | 0.003 | 0.03 | 1.04 | 0.02 | 0.01 | 0.033 | 0.009 | 0.0014 |
| Comparative Bearing D | Outer Race | 0.20 | 0.26 | 0.60 | 0.011 | 0.007 | 2.27 | 0.68 | 0.28 | 0.10 | 0.038 | 0.012 | 0.0011 |
| | Inner Race | 0.20 | 0.26 | 0.60 | 0.011 | 0.007 | 2.27 | 0.68 | 0.28 | 0.10 | 0.038 | 0.012 | 0.0011 |
| | Roller | 0.22 | 0.15 | 0.40 | 0.019 | 0.005 | 1.77 | 0.35 | 0.21 | 0.02 | 0.032 | 0.010 | 0.0014 |
| Comparative Bearing E | Outer Race | 0.15 | 0.24 | 0.49 | 0.018 | 0.003 | 3.30 | 1.02 | 0.14 | 0.07 | 0.032 | 0.010 | 0.0008 |
| | Inner Race | 0.15 | 0.24 | 0.49 | 0.018 | 0.003 | 3.30 | 1.02 | 0.14 | 0.07 | 0.032 | 0.010 | 0.0008 |
| | Roller | 1.03 | 0.50 | 0.99 | 0.017 | 0.002 | 0.05 | 1.00 | 0.02 | 0.08 | 0.035 | 0.009 | 0.0012 |
| Comparative Bearing F | Outer Race | 0.34 | 0.41 | 0.71 | 0.013 | 0.003 | 1.48 | 1.41 | 1.01 | 0.10 | 0.042 | 0.015 | 0.0008 |
| | Inner Race | 0.34 | 0.41 | 0.71 | 0.013 | 0.003 | 1.48 | 1.41 | 1.01 | 0.10 | 0.042 | 0.015 | 0.0008 |
| | Roller | 0.19 | 0.28 | 0.65 | 0.025 | 0.005 | 0.63 | 0.40 | 0.38 | 0.14 | 0.020 | 0.005 | 0.0009 |
| Comparative Bearing G | Outer Race | 0.45 | 0.49 | 1.30 | 0.018 | 0.002 | 0.10 | 1.25 | 0.01 | 0.14 | 0.029 | 0.010 | 0.0015 |
| | Inner Race | 0.45 | 0.49 | 1.30 | 0.018 | 0.002 | 0.10 | 1.25 | 0.01 | 0.14 | 0.029 | 0.010 | 0.0015 |
| | Roller | 0.45 | 0.49 | 1.30 | 0.018 | 0.002 | 0.10 | 1.25 | 0.01 | 0.14 | 0.029 | 0.010 | 0.0015 |
| Comparative Bearing I | Outer Race | 0.95 | 0.19 | 0.37 | 0.017 | 0.005 | 0.77 | 1.31 | 0.61 | 0.15 | 0.037 | 0.008 | 0.0015 |
| | Inner Race | 0.95 | 0.19 | 0.37 | 0.017 | 0.005 | 0.77 | 1.31 | 0.61 | 0.15 | 0.037 | 0.008 | 0.0015 |
| | Roller | 0.42 | 0.33 | 0.75 | 0.019 | 0.006 | 0.25 | 1.35 | 0.01 | 0.25 | 0.045 | 0.015 | 0.0008 |

| Bearing No. | Cu equivalent and Difference therebetween (wt %) | | | | Method of heat treatment | D |
|---|---|---|---|---|---|---|
| | $Cu_{eq.}$ | A | B | C | | |
| Comparative Bearing B | 0.35 | 0 | −0.31 | −0.31 | Through hardening | 2.9 |
| | 0.35 | | | | Through hardening | |
| | 0.04 | | | | Through hardening | |
| Comparative Bearing C | 1.52 | 0 | −1.50 | −1.50 | Carburizing | 1.0 |
| | 1.52 | | | | Carburizing | |
| | 0.02 | | | | Carburizing | |
| Comparative Bearing D | 0.78 | 0 | −0.23 | −0.23 | Carburizing | 3.5 |
| | 0.78 | | | | Carburizing | |
| | 0.55 | | | | Carburizing | |
| Comparative Bearing E | 1.06 | 0 | −0.96 | −0.96 | Carburizing | 1.8 |
| | 1.06 | | | | Carburizing | |
| | 0.10 | | | | Through hardening | |

TABLE 1-continued

|  |  |  |  |  |  |  |
|---|---|---|---|---|---|---|
| Comparative Bearing F | 0.54 | 0 | −0.21 | −0.21 | Carburizing | 3.9 |
|  | 0.54 |  |  |  | Carburizing |  |
|  | 0.33 |  |  |  | Carburizing |  |
| Comparative Bearing G | 0.17 | 0 | 0 | 0 | Carbo-nitriding | 17 |
|  | 0.17 |  |  |  | Carbo-nitriding |  |
|  | 0.17 |  |  |  | Carburizing |  |
| Comparative Bearing I | 0.38 | 0 | −0.05 | −0.05 | Through hardening | 13 |
|  | 0.38 |  |  |  | Through hardening |  |
|  | 0.33 |  |  |  | Carburizing |  |

A: $\Delta Cu_{eq.\ BA}$,
B: $\Delta Cu_{eq.\ CA}$,
C: $\Delta Cu_{eq.\ max}$,
D: Relative value of the life in water-mixed grease (L10 wg/L10 pg) × 100

TABLE 2

A: $\Delta Cu_{eq.BA}$, B: $\Delta Cu_{eq.CA}$, C: $\Delta Cu_{eq.max}$, D: Relative value of the life in water-mixed grease (L10 wg/L10 pg) × 100

| Bearing No. | Element | Composition of Raw Material (wt %) | | | | | | | | | | | |
|---|---|---|---|---|---|---|---|---|---|---|---|---|---|
|  |  | C | Si | Mn | P | S | Ni | Cr | Mo | Cu | Al | N | O |
| Bearing of Invention | | | | | | | | | | | | | |
| P | Outer Race | 0.30 | 0.23 | 0.76 | 0.025 | 0.004 | 0.33 | 1.60 | 0.94 | 0.07 | 0.060 | 0.015 | 0.0009 |
|  | Inner Race | 0.30 | 0.23 | 0.76 | 0.025 | 0.004 | 0.33 | 1.60 | 0.94 | 0.07 | 0.060 | 0.015 | 0.0009 |
|  | Roller | 0.42 | 0.33 | 0.75 | 0.019 | 0.006 | 0.25 | 1.35 | 0.01 | 0.25 | 0.045 | 0.015 | 0.0008 |
| Q | Outer Race | 0.99 | 0.30 | 0.43 | 0.019 | 0.003 | 0.42 | 1.55 | 0.02 | 0.05 | 0.027 | 0.008 | 0.0015 |
|  | Inner Race | 0.99 | 0.30 | 0.43 | 0.019 | 0.003 | 0.42 | 1.55 | 0.02 | 0.05 | 0.027 | 0.008 | 0.0015 |
|  | Roller | 0.42 | 0.33 | 0.75 | 0.019 | 0.006 | 0.25 | 1.35 | 0.01 | 0.25 | 0.045 | 0.015 | 0.0008 |
| R | Outer Race | 0.10 | 0.25 | 1.50 | 0.015 | 0.003 | 0.03 | 1.04 | 0.02 | 0.01 | 0.033 | 0.009 | 0.0014 |
|  | Inner Race | 0.10 | 0.25 | 1.50 | 0.015 | 0.003 | 0.03 | 1.04 | 0.02 | 0.01 | 0.033 | 0.009 | 0.0014 |
|  | Roller | 0.10 | 0.24 | 0.49 | 0.018 | 0.003 | 4.50 | 1.04 | 1.50 | 0.17 | 0.035 | 0.010 | 0.0015 |
| S | Outer Race | 0.22 | 0.15 | 0.40 | 0.019 | 0.005 | 1.77 | 0.35 | 0.21 | 0.02 | 0.032 | 0.010 | 0.0014 |
|  | Inner Race | 0.22 | 0.15 | 0.40 | 0.019 | 0.005 | 1.77 | 0.35 | 0.21 | 0.02 | 0.032 | 0.010 | 0.0014 |
|  | Roller | 0.20 | 0.26 | 0.60 | 0.011 | 0.007 | 2.27 | 0.68 | 0.28 | 0.10 | 0.038 | 0.012 | 0.0011 |
| T | Outer Race | 0.19 | 0.28 | 0.65 | 0.025 | 0.005 | 0.63 | 0.40 | 0.38 | 0.14 | 0.020 | 0.005 | 0.0009 |
|  | Inner Race | 0.19 | 0.28 | 0.65 | 0.025 | 0.005 | 0.63 | 0.40 | 0.38 | 0.14 | 0.020 | 0.005 | 0.0009 |
|  | Roller | 0.34 | 0.41 | 0.71 | 0.013 | 0.003 | 1.48 | 1.41 | 1.01 | 0.10 | 0.042 | 0.015 | 0.0008 |
| U | Outer Race | 0.32 | 0.29 | 0.75 | 0.016 | 0.003 | 1.50 | 1.50 | 1.00 | 0.12 | 0.029 | 0.012 | 0.0009 |
|  | Inner Race | 0.32 | 0.29 | 0.75 | 0.016 | 0.003 | 1.50 | 1.50 | 1.00 | 0.12 | 0.029 | 0.012 | 0.0009 |
|  | Roller | 0.45 | 0.28 | 0.62 | 0.022 | 0.008 | 2.13 | 3.50 | 0.28 | 0.08 | 0.025 | 0.009 | 0.0008 |
| V | Outer Race | 1.05 | 0.28 | 0.43 | 0.016 | 0.004 | 0.01 | 1.35 | 0.01 | 0.09 | 0.029 | 0.005 | 0.0005 |
|  | Inner Race | 1.09 | 0.26 | 0.38 | 0.012 | 0.005 | 0.06 | 1.32 | 0.02 | 0.11 | 0.029 | 0.010 | 0.0011 |
|  | Roller | 1.10 | 0.25 | 0.45 | 0.021 | 0.002 | 1.32 | 1.40 | 1.02 | 0.13 | 0.024 | 0.005 | 0.0005 |
| W | Outer Race | 1.03 | 0.50 | 0.99 | 0.017 | 0.002 | 0.05 | 1.00 | 0.02 | 0.08 | 0.035 | 0.009 | 0.0012 |
|  | Inner Race | 1.03 | 0.50 | 0.99 | 0.017 | 0.002 | 0.05 | 1.00 | 0.02 | 0.08 | 0.035 | 0.009 | 0.0012 |
|  | Roller | 0.15 | 0.24 | 0.49 | 0.018 | 0.003 | 3.30 | 1.02 | 0.14 | 0.07 | 0.032 | 0.010 | 0.0008 |
| X | Outer Race | 1.03 | 0.50 | 0.99 | 0.017 | 0.002 | 0.05 | 1.00 | 0.02 | 0.08 | 0.035 | 0.009 | 0.0012 |
|  | Inner Race | 0.15 | 0.24 | 0.49 | 0.018 | 0.003 | 3.30 | 1.02 | 0.14 | 0.07 | 0.032 | 0.010 | 0.0008 |
|  | Roller | 1.03 | 0.50 | 0.99 | 0.017 | 0.002 | 0.05 | 1.00 | 0.02 | 0.08 | 0.035 | 0.009 | 0.0012 |
| Y | Outer Race | 1.03 | 0.50 | 0.99 | 0.017 | 0.002 | 0.05 | 1.00 | 0.02 | 0.08 | 0.035 | 0.009 | 0.0012 |
|  | Inner Race | 1.00 | 0.25 | 0.45 | 0.015 | 0.003 | 0.07 | 0.75 | 0.01 | 0.23 | 0.025 | 0.009 | 0.0015 |
|  | Roller | 1.03 | 0.50 | 0.99 | 0.017 | 0.002 | 0.05 | 1.00 | 0.02 | 0.08 | 0.035 | 0.009 | 0.0012 |

| Bearing No. | Cu equivalent and Difference therebetween (wt %) | | | | Method of heat treatment | D |
|---|---|---|---|---|---|---|
|  | $Cu_{eq.}$ | A | B | C | | |
| Bearing of Invention | | | | | | |
| P | 0.17 | 0 | 0.16 | 0.16 | Carbo-nitriding | 100 |
|  | 0.17 |  |  |  | Carbo-nitriding |  |
|  | 0.33 |  |  |  | Carburizing |  |
| Q | 0.18 | 0 | 0.15 | 0.15 | Through hardening | 100 |
|  | 0.18 |  |  |  | Through hardening |  |

TABLE 2-continued

A: $\Delta Cu_{eq.BA}$, B: $\Delta Cu_{eq.CA}$, C: $\Delta Cu_{eq.max}$, D: Relative value of the life in water-mixed grease (L10 wg/L10 pg) × 100

|   |   |   |   |   |   |   |
|---|---|---|---|---|---|---|
|   | 0.33 |   |   |   | Carburizing |   |
| R | 0.02 | 0 | 1.50 | 1.50 | Carburizing | 100 |
|   | 0.02 |   |   |   | Carburizing |   |
|   | 1.52 |   |   |   | Carburizing |   |
| S | 0.55 | 0 | 0.23 | 0.23 | Carburizing | 100 |
|   | 0.55 |   |   |   | Carburizing |   |
|   | 0.78 |   |   |   | Carburizing |   |
| T | 0.33 | 0 | 0.21 | 0.21 | Carburizing | 100 |
|   | 0.33 |   |   |   | Carburizing |   |
|   | 0.54 |   |   |   | Carburizing |   |
| U | 0.57 | 0 | 0.15 | 0.15 | Carbonitriding | 100 |
|   | 0.57 |   |   |   | Carbonitriding |   |
|   | 0.72 |   |   |   | Carburizing |   |
| V | 0.09 | 0.04 | 0.44 | 0.48 | Through hardening | 100 |
|   | 0.13 |   |   |   | Through hardening |   |
|   | 0.53 |   |   |   | Through hardening |   |
| W | 0.10 | 0 | 0.96 | 0.96 | Through hardening | 100 |
|   | 0.10 |   |   |   | Through hardening |   |
|   | 1.06 |   |   |   | Carburizing |   |
| X | 0.10 | 0.96 | 0 | 0.96 | Through hardening | 100 |
|   | 1.06 |   |   |   | Carburizing |   |
|   | 0.10 |   |   |   | Through hardening |   |
| Y | 0.10 | 0.15 | 0 | 0.15 | Through hardening | 100 |
|   | 0.25 |   |   |   | Through hardening |   |
|   | 0.10 |   |   |   | Through hardening |   |

In the tables, there is:

$Cu_{eq}$: Cu equivalent of each bearing part $\Delta Cu_{eq.CA}$: the value resulting from the subtraction of the Cu equivalent of the outer race 2 from the Cu equivalent of the rollers 3

$\Delta Cu_{eq.BA}$: the value resulting from the subtraction of the Cu equivalent of the outer race 2 from the Cu equivalent of the inner race 1

$\Delta Cu_{eq.max}$: the sum of $\Delta Cu_{eq.CA}$ and $\Delta Cu_{eq.BA}$ (or it may be defined as the value resulting from the subtraction of the doubled value of the Cu equivalent of the outer race 2 from the sum of the Cu equivalent of the rollers 3 and the Cu equivalent of the inner race 1).

Here, the life evaluation of each bearing was conducted by first obtaining the 90% residual life in pure grease (L10pg), then by obtaining the 90% residual life in the aforementioned water-mixed grease lubricant (L10wg), and then by the life relative value from the below formula.

$$\frac{L10wg}{L10pg} \times 100$$

The surface hardness of each bearing is HRC 58-64. The surface carbon concentration of the bearings which have undergone carburizing treatment is 0.8–1.1 weight %. The surface carbon concentration of the bearings which have undergone carbonitriding treatment is 0.8–1.1 weight %, and the surface nitrogen concentration is 0.05–0.3 weight %. The surface retained austenite of the bearings which have undergone through hardening is 5–15 volume %. The surface retained austenite of the bearings which have undergone carburizing treatment and the bearings which have undergone carbonitriding treatment is 5–45 volume %.

Prior to the life tests, testing was conducted for 10 hours under the aforementioned test conditions one bearing each from the bearings shown in Table 1 and Table 2 and the bearings A, H of Table 3. At the end of the testing, the hydrogen concentration in the steel was measured at a position within ±10° of the maximum stress load area of the outer race 2 (the non-rotating side raceway), and the increase ΔH (ppm) in the hydrogen concentration was measured when the product was brand new. When the relation between the increase ΔH (ppm) in the hydrogen concentration and $\Delta Cu_{eq.max}$ was obtained, the results shown in FIG. 2 (shown by representative values) were obtained.

Figure 2:
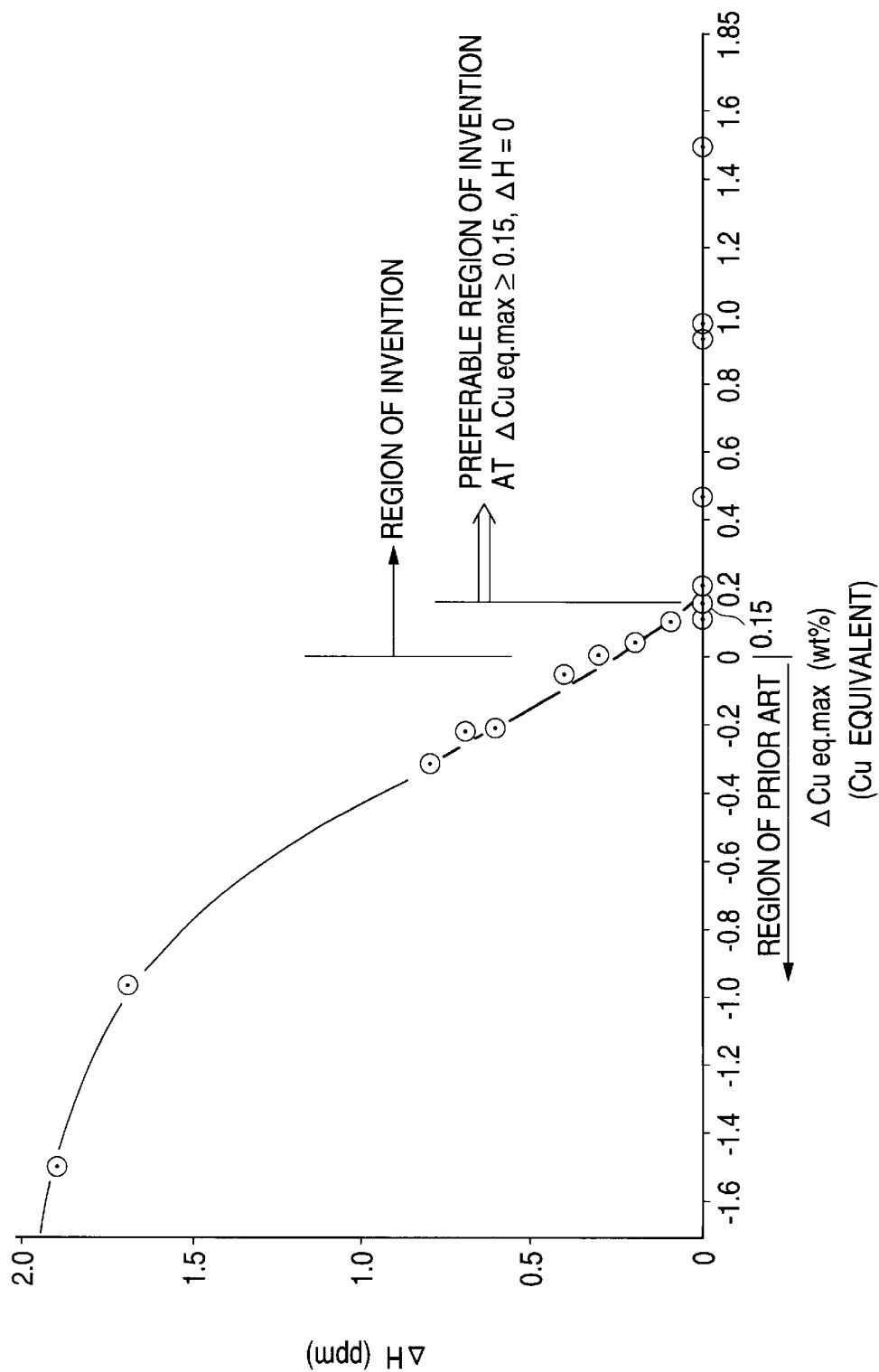
FIG. 2 shows the relation between the difference $\Delta CU_{eq.max}$ in Cu equivalents and the increase in the hydrogen concentration in the vicinity of the maximum stress load area of the outer race.

As is clear from FIG. 2, as $\Delta Cu_{eq.max}$ grows larger, the increase ΔH in the hydrogen concentration decreases. In particular, when $\Delta Cu_{eq.max}$ becomes larger than 0, it approaches 0 ppm, and when $\Delta Cu_{eq.max}$ becomes 0.15 or more, ΔH becomes 0 ppm, in short, the rise in the hydrogen concentration ceases.

From these results, the hydrogen absorption in the maximum stress load area of the non-rotating side raceway can be kept close to zero or at zero by setting $\Delta Cu_{eq.max}$ at a value higher than 0, and preferably to 0.15 or more, and any reduction in durable life can be suppressed even when water becomes mixed with the lubricant.

Figure 3:
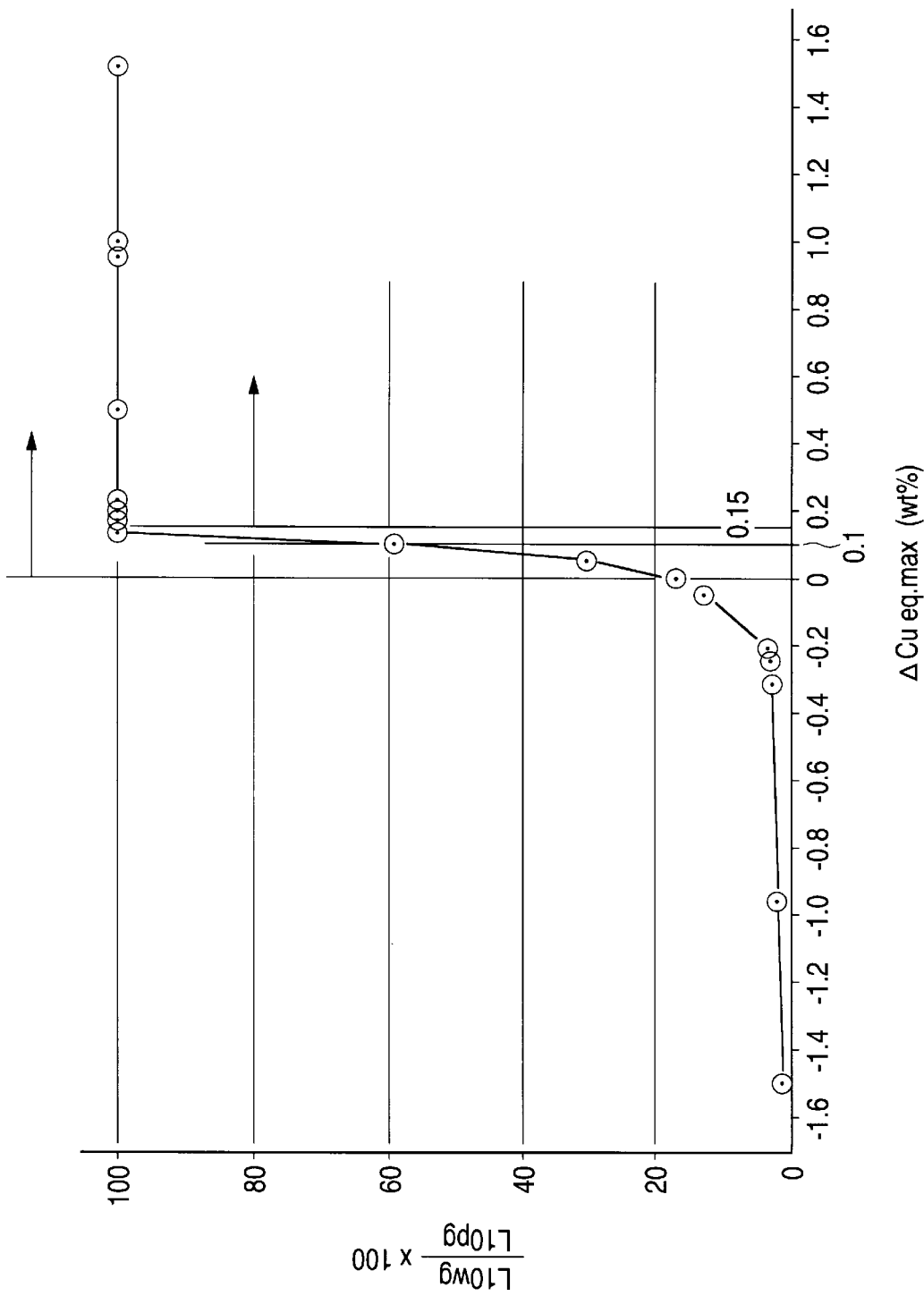
FIG. 3 shows the relation between the difference $\Delta Cu_{eq.max}$ in Cu equivalents and the life relative value.

In practice, when the relation between $\Delta Cu_{eq.max}$ and the life relative value is intended to be illustrated, the results shown in FIG. 3 (shown by representative values) is obtained. That is, it is clear that when $\Delta Cu_{eq.max}$ is set at a value higher than zero, the life relative value rapidly rises, and that when $\Delta Cu_{eq.max}$ is set at 0.15 or more, the life value in the water-mixed grease lubricant becomes the same as the life value in pure grease (life relative value=100).

Thus, with rolling bearings which are used in environments where water becomes mixed with the lubricant, it is clear that when the sum of the Cu equivalents $Cu_{eq.}$=[Cu weight %]+0.3×[Ni weight %] of the rolling element and the rotating side raceway is higher than the doubled value of the Cu equivalent $Cu_{eq.}$ of the non-rotating side race, there is a rapid improvement in life, and it is clear that when the sum is higher by 0.15 or more, the rise in the hydrogen concentration in the maximum stress load area of the non-rotating side raceway ceases, and even when water becomes mixed with the lubricant, a value identical to the life value in pure grease (life relative value=100) can be maintained.

In order to retard hydrogen absorption in the non-rotating side race when $\Delta Cu_{eq.max}$ is larger than 0 and less than 0.15, and in order to retard hydrogen absorption in the rotating side race and the rolling elements when $\Delta Cu_{eq.max}$ is larger than 1.5 and not larger than 3.70, it is preferable to refine the crystal grain size of the races and the rolling elements. For this purpose, it is preferable to set the Al concentration of the respective raw material at 0.02 weight % or more, and the N concentration of the respective raw material at 0.005 weight % or more.

Next, a second embodiment is explained.

Using bearings A1–A6 and H1–H6 of bearing numbers A and H in Table 3, which were manufactured with changes to the carbon concentration and oxygen concentration of the raw material composing the outer race 2 (non-rotating side race), the results shown in the below Table 3 were obtained when the same life tests as in the first embodiment were conducted.

TABLE 3

| Bearing No. | Element | Composition of Raw Material (wt %) | | | | | | | | | | | |
|---|---|---|---|---|---|---|---|---|---|---|---|---|---|
| | | C | Si | Mn | P | S | Ni | Cr | Mo | Cu | Al | N | O |
| Bearing of Invention | | | | | | | | | | | | | |
| A | Outer Race | 0.97 | 0.22 | 0.45 | 0.025 | 0.008 | 0.01 | 1.41 | 0.01 | 0.05 | 0.020 | 0.005 | 0.0015 |
| | Inner Race | 0.97 | 0.22 | 0.45 | 0.025 | 0.008 | 0.01 | 1.41 | 0.01 | 0.05 | 0.020 | 0.005 | 0.0015 |
| | Roller | 1.08 | 0.15 | 0.44 | 0.009 | 0.007 | 0.01 | 1.35 | 0.01 | 0.15 | 0.028 | 0.007 | 0.0015 |
| A1 | Outer Race | 0.40 | 0.24 | 0.45 | 0.023 | 0.002 | 0.01 | 1.34 | 0.01 | 0.05 | 0.023 | 0.006 | 0.0015 |
| | Inner Race | 0.97 | 0.22 | 0.45 | 0.025 | 0.008 | 0.01 | 1.41 | 0.01 | 0.05 | 0.020 | 0.005 | 0.0015 |
| | Roller | 1.08 | 0.15 | 0.44 | 0.009 | 0.007 | 0.01 | 1.35 | 0.01 | 0.15 | 0.028 | 0.007 | 0.0015 |
| A2 | Outer Race | 0.35 | 0.28 | 0.47 | 0.015 | 0.006 | 0.01 | 1.40 | 0.01 | 0.05 | 0.022 | 0.005 | 0.0015 |
| | Inner Race | 0.97 | 0.22 | 0.45 | 0.025 | 0.008 | 0.01 | 1.41 | 0.01 | 0.05 | 0.020 | 0.005 | 0.0015 |
| | Roller | 1.08 | 0.15 | 0.44 | 0.009 | 0.007 | 0.01 | 1.35 | 0.01 | 0.15 | 0.028 | 0.007 | 0.0015 |
| A3 | Outer Race | 0.10 | 0.26 | 0.39 | 0.019 | 0.007 | 0.01 | 1.35 | 0.01 | 0.05 | 0.028 | 0.006 | 0.0015 |
| | Inner Race | 0.97 | 0.22 | 0.45 | 0.025 | 0.008 | 0.01 | 1.41 | 0.01 | 0.05 | 0.020 | 0.005 | 0.0015 |
| | Roller | 1.08 | 0.15 | 0.44 | 0.009 | 0.007 | 0.01 | 1.35 | 0.01 | 0.15 | 0.028 | 0.007 | 0.0015 |
| A4 | Outer Race | 0.95 | 0.26 | 0.48 | 0.021 | 0.005 | 0.01 | 1.36 | 0.01 | 0.05 | 0.032 | 0.007 | 0.0010 |
| | Inner Race | 0.97 | 0.22 | 0.45 | 0.025 | 0.008 | 0.01 | 1.41 | 0.01 | 0.05 | 0.020 | 0.005 | 0.0015 |
| | Roller | 1.08 | 0.15 | 0.44 | 0.009 | 0.007 | 0.01 | 1.35 | 0.01 | 0.15 | 0.028 | 0.007 | 0.0015 |
| A5 | Outer Race | 1.00 | 0.29 | 0.43 | 0.016 | 0.003 | 0.01 | 1.35 | 0.01 | 0.05 | 0.022 | 0.006 | 0.0009 |
| | Inner Race | 0.97 | 0.22 | 0.45 | 0.025 | 0.008 | 0.01 | 1.41 | 0.01 | 0.05 | 0.020 | 0.005 | 0.0015 |
| | Roller | 1.08 | 0.15 | 0.44 | 0.009 | 0.007 | 0.01 | 1.35 | 0.01 | 0.15 | 0.028 | 0.007 | 0.0015 |
| A6 | Outer Race | 0.99 | 0.27 | 0.46 | 0.018 | 0.008 | 0.01 | 1.50 | 0.01 | 0.05 | 0.037 | 0.006 | 0.0005 |
| | Inner Race | 0.97 | 0.22 | 0.45 | 0.025 | 0.008 | 0.01 | 1.41 | 0.01 | 0.05 | 0.020 | 0.005 | 0.0015 |
| | Roller | 1.08 | 0.15 | 0.44 | 0.009 | 0.007 | 0.01 | 1.35 | 0.01 | 0.15 | 0.028 | 0.007 | 0.0015 |
| H | Outer Race | 0.98 | 0.34 | 0.35 | 0.012 | 0.006 | 0.76 | 1.45 | 0.50 | 0.05 | 0.033 | 0.006 | 0.0015 |
| | Inner Race | 0.98 | 0.34 | 0.35 | 0.012 | 0.006 | 0.76 | 1.45 | 0.50 | 0.05 | 0.033 | 0.006 | 0.0015 |
| | Roller | 0.42 | 0.33 | 0.75 | 0.019 | 0.006 | 0.25 | 1.35 | 0.01 | 0.25 | 0.045 | 0.015 | 0.0008 |
| H1 | Outer Race | 0.37 | 0.33 | 0.43 | 0.019 | 0.002 | 0.76 | 1.38 | 0.51 | 0.05 | 0.036 | 0.008 | 0.0009 |
| | Inner Race | 0.98 | 0.34 | 0.35 | 0.012 | 0.006 | 0.76 | 1.45 | 0.50 | 0.05 | 0.033 | 0.006 | 0.0015 |
| | Roller | 0.42 | 0.33 | 0.75 | 0.019 | 0.006 | 0.25 | 1.35 | 0.01 | 0.25 | 0.045 | 0.015 | 0.0008 |
| H2 | Outer Race | 0.35 | 0.31 | 0.49 | 0.024 | 0.006 | 0.76 | 1.36 | 0.50 | 0.05 | 0.029 | 0.007 | 0.0010 |
| | Inner Race | 0.98 | 0.34 | 0.35 | 0.012 | 0.006 | 0.76 | 1.45 | 0.50 | 0.05 | 0.033 | 0.006 | 0.0015 |
| | Roller | 0.42 | 0.33 | 0.75 | 0.019 | 0.006 | 0.25 | 1.35 | 0.01 | 0.25 | 0.045 | 0.015 | 0.0008 |
| H3 | Outer Race | 0.35 | 0.28 | 0.44 | 0.022 | 0.003 | 0.76 | 1.38 | 0.51 | 0.05 | 0.022 | 0.006 | 0.0009 |
| | Inner Race | 0.98 | 0.34 | 0.35 | 0.012 | 0.006 | 0.76 | 1.45 | 0.50 | 0.05 | 0.033 | 0.006 | 0.0015 |
| | Roller | 0.42 | 0.33 | 0.75 | 0.019 | 0.006 | 0.25 | 1.35 | 0.01 | 0.25 | 0.045 | 0.015 | 0.0008 |

TABLE 3-continued

| | | | | | | | | | | | | | | |
|---|---|---|---|---|---|---|---|---|---|---|---|---|---|---|
| H4 | Outer Race | 0.20 | 0.23 | 0.41 | 0.012 | 0.003 | 0.76 | 1.38 | 0.49 | 0.05 | 0.033 | 0.007 | 0.0006 |
| | Inner Race | 0.98 | 0.34 | 0.35 | 0.012 | 0.006 | 0.76 | 1.45 | 0.50 | 0.05 | 0.033 | 0.006 | 0.0015 |
| | Roller | 0.42 | 0.33 | 0.75 | 0.019 | 0.006 | 0.25 | 1.35 | 0.01 | 0.25 | 0.045 | 0.015 | 0.0008 |

| Bearing No. | $Cu_{eq.}$ | A | B | C | Method of heat treatment | D |
|---|---|---|---|---|---|---|
| *Bearing of Invention* | | | | | | |
| A | 0.05 | 0 | 0.10 | 0.10 | Through hardening | 59 |
| | 0.05 | | | | Through hardening | |
| | 0.15 | | | | Through hardening | |
| A1 | 0.05 | 0 | 0.10 | 0.10 | Carbo-nitriding | 97 |
| | 0.05 | | | | Through hardening | |
| | 0.15 | | | | Through hardening | |
| A2 | 0.05 | 0 | 0.10 | 0.10 | Carbo-nitriding | 100 |
| | 0.05 | | | | Through hardening | |
| | 0.15 | | | | Through hardening | |
| A3 | 0.05 | 0 | 0.10 | 0.10 | Carburizing | 100 |
| | 0.05 | | | | Through hardening | |
| | 0.15 | | | | Through hardening | |
| A4 | 0.05 | 0 | 0.10 | 0.10 | Through hardening | 96 |
| | 0.05 | | | | Through hardening | |
| | 0.15 | | | | Through hardening | |
| A5 | 0.05 | 0 | 0.10 | 0.10 | Through hardening | 100 |
| | 0.05 | | | | Through hardening | |
| | 0.15 | | | | Through hardening | |
| A6 | 0.05 | 0 | 0.10 | 0.10 | Through hardening | 100 |
| | 0.05 | | | | Through hardening | |
| | 0.15 | | | | Through hardening | |
| H | 0.28 | 0 | 0.05 | 0.05 | Through hardening | 31 |
| | 0.28 | | | | Through hardening | |
| | 0.33 | | | | Carburizing | |
| H1 | 0.28 | 0 | 0.05 | 0.05 | Carburizing | 98 |
| | 0.28 | | | | Through hardening | |
| | 0.33 | | | | Carburizing | |
| H2 | 0.28 | 0 | 0.05 | 0.05 | Carburizing | 97 |
| | 0.28 | | | | Through hardening | |
| | 0.33 | | | | Carburizing | |
| H3 | 0.28 | 0 | 0.05 | 0.05 | Carburizing | 100 |
| | 0.28 | | | | Through hardening | |
| | 0.33 | | | | Carburizing | |
| H4 | 0.28 | 0 | 0.05 | 0.05 | Carburizing | 100 |
| | 0.28 | | | | Through hardening | |
| | 0.33 | | | | Carburizing | |

A: $\Delta Cu_{eq.\ BA}$,
B: $\Delta Cu_{eq.\ CA}$,
C: $\Delta Cu_{eq.\ max}$,
D: Relative value of the life in water-mixed grease (L10 wg/L10 pg) × 100

With regard to bearings A, A1, A2, A3, when the residual stress of the raceway surface of the outer race 2 (uppermost surface) was measured, the results shown in Table 4 with maximum values were obtained.

TABLE 4

| Bearing No. | Residual stress of the uppermost raceway surface of the outer race (MPa) |
|---|---|
| A | +10 |
| A1 | −40 |
| A2 | −50 |
| A3 | −120 |

As is clear from Table 4, as the carbon concentration of the raw material composing the non-rotating side race becomes smaller, the residual compressive stress grows larger.

Figure 4:
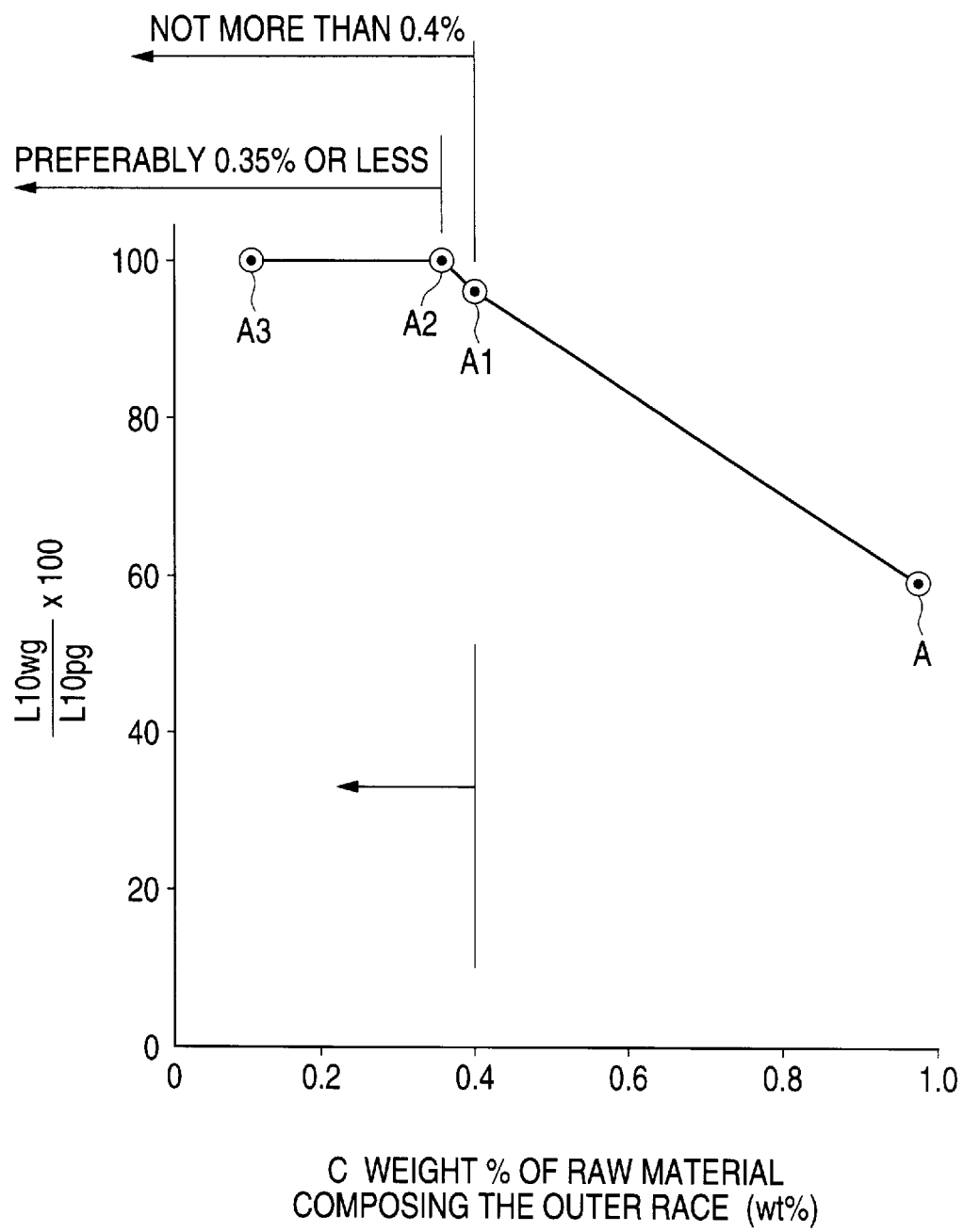
FIG. 4 shows the relation between the carbon concentration of the raw material composing the non-rotating side race and the life relative value in the case where $\Delta Cu_{eq.max}$ is 0.10.

Based on Table 3, when an attempt is made to illustrate the relation of the carbon concentrations and the life relative values of the raw material of the respective outer races 2 of bearing numbers A, A1, A2, A3 for which $\Delta Cu_{eq.max}$ is 0.10, it is as shown in FIG. 4. As is clear from FIG. 4, as the carbon concentration declines, the life relative value rises. When the carbon concentration is 0.4 or less, the life relative value is almost 100, and when the carbon concentration is 0.35 weight % or less, the life relative value is 100, that is, the life value in water-mixed grease lubricant becomes the same as the life value in pure grease.

This is because the residual stress of the raceway surface becomes a compressive stress of 50 MPa or more, and the hydrogen embrittlement flaking is-suppressed. Thus, in cases where the carbon concentration of the raw material composing the non-rotating side race is 0.4 weight % or less, preferably 0.35 weight % or less, an effective residual compressive stress capable of suppressing hydrogen embrittlement flaking is produced on the raceway surface, and at $\Delta Cu_{eq.max}$ is 0.10 or more, the life in water-mixed grease lubricant is the same as the life in pure grease.

It is a matter of course that the reduced carbon concentration of the raw material composing the non-rotating side race is effective in prolonging the life in water-mixed grease lubricant when $\Delta Cu_{eq.max}$ is 0.10 or more and less than 0.15, and that there is no influence when $\Delta Cu_{eq.max}$ is 0.15 or more.

Figure 5:
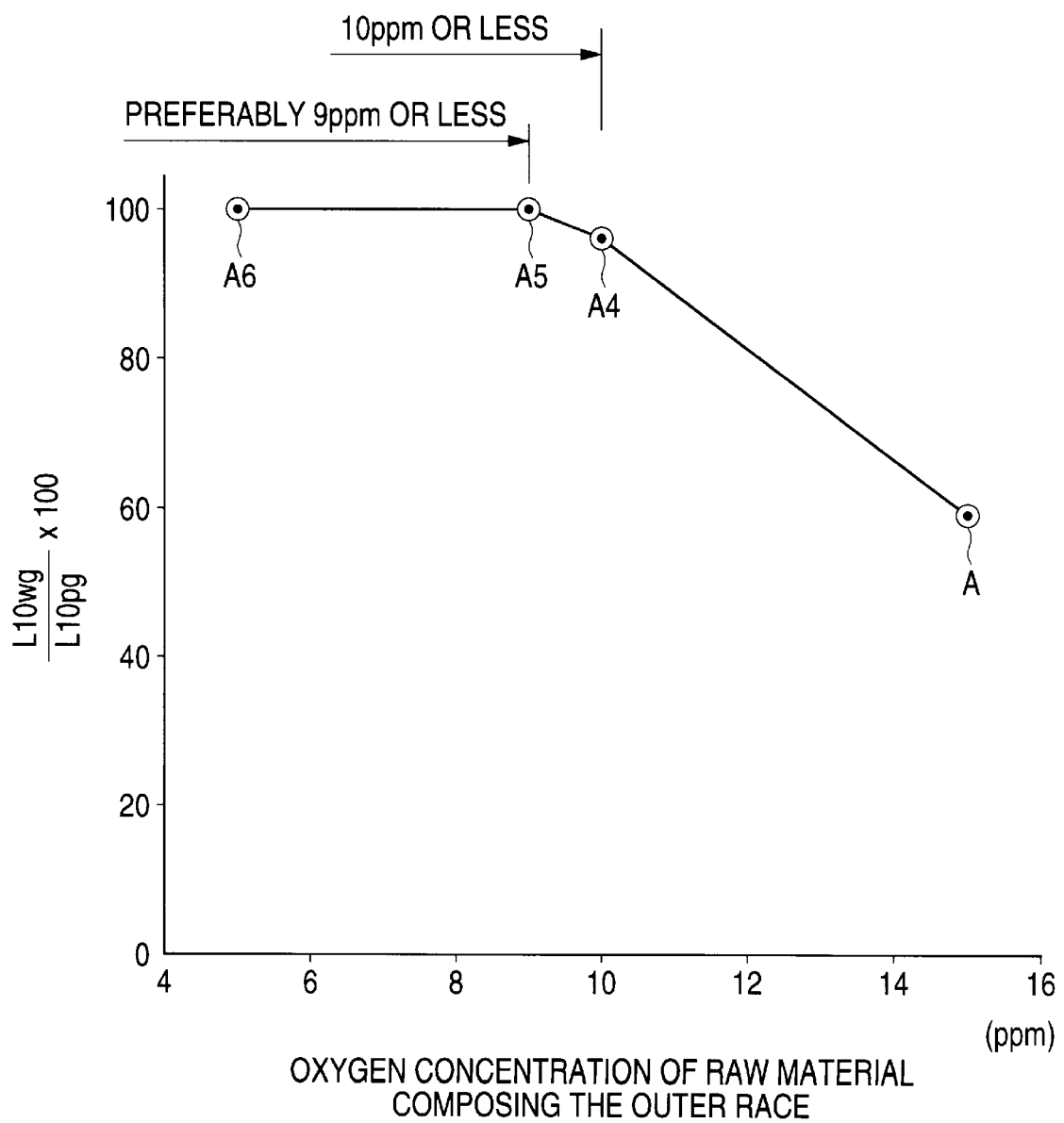
FIG. 5 shows the relation between the oxygen concentration of the raw material composing the non-rotating side race and the life relative value in the case where $\Delta Cu_{eq.max}$ is 0.10.

With regard to bearings A, A4, A5, A6 where $\Delta Cu_{eq.max}$ is 0.10, the relation of the oxygen concentration and the life relative value of the raw material of the outer race 2 may be illustrated as shown in FIG. 5.

As is clear from FIG. 5, as the oxygen concentration declines, the life relative value rises. When the oxygen concentration is 10 ppm or less, the life relative value almost approaches 100, and when the oxygen concentration is 9 ppm or less, the life relative value becomes 100, that is, the life value necessary for bearings in water-mixed grease lubricant becomes identical to the life value of bearings in pure grease.

This is because the hydrogen atoms are gasified, and there is a reduction in the size and amount of the interposition at the sites which become the origin of hydrogen embrittlement flaking. Thus, when the oxygen concentration of the raw material composing the non-rotating side raceway is set at 10 ppm or less, and preferably at 9 ppm or less, the hydrogen atoms are gasified, and there is a reduction in the size and amount of the interposition at the sites which become the origin of hydrogen embrittlement flaking. Due to this improvement in hydrogen embrittlement flaking resistance, the life value in water-mixed grease lubricant becomes identical to the life value in pure grease when $\Delta Cu_{eq.max}$ is 0.10 or more.

It is a matter of course that the reduced carbon concentration of the raw material composing the non-rotating side race is effective in prolonging the life in water-mixed grease lubricant when $\Delta Cu_{eq.max}$ is 0.10 or more and less than 0.15, and that there is no influence when $\Delta Cu_{eq.max}$ is 0.15 or more.

With regard to the steelmaking method, the well-known Electro-Slab-Remelting method (referring to ESR method, hereinafter) and the well-known Vapor-Arc-Remelting method (referring to VAR method, hereinafter) are more effective than the RH degassing method in refining interposition and markedly reinforcing hydrogen embrittlement resistance even at identical oxygen concentrations, and are consequently able to obtain high life relative values even when $\Delta Cu_{eq.max}$ is negative. For example, if the steelmaking method is the VAR method when the oxygen concentration of the non-rotating side raceway is 9 ppm or less, a life relative value of 90 or more is obtained when $\Delta Cu_{eq.max}$ is −0.3 or more. If it is the ESR method, on the other hand, a life relative value of 90 or more is obtained when $\Delta Cu_{eq.max}$ is −0.2 or more. It is a matter of course that the VAR method and the ESR method have no influence on the life relative value when $\Delta Cu_{eq.max}$ is in the range of 0.15 or more.

Figure 6:
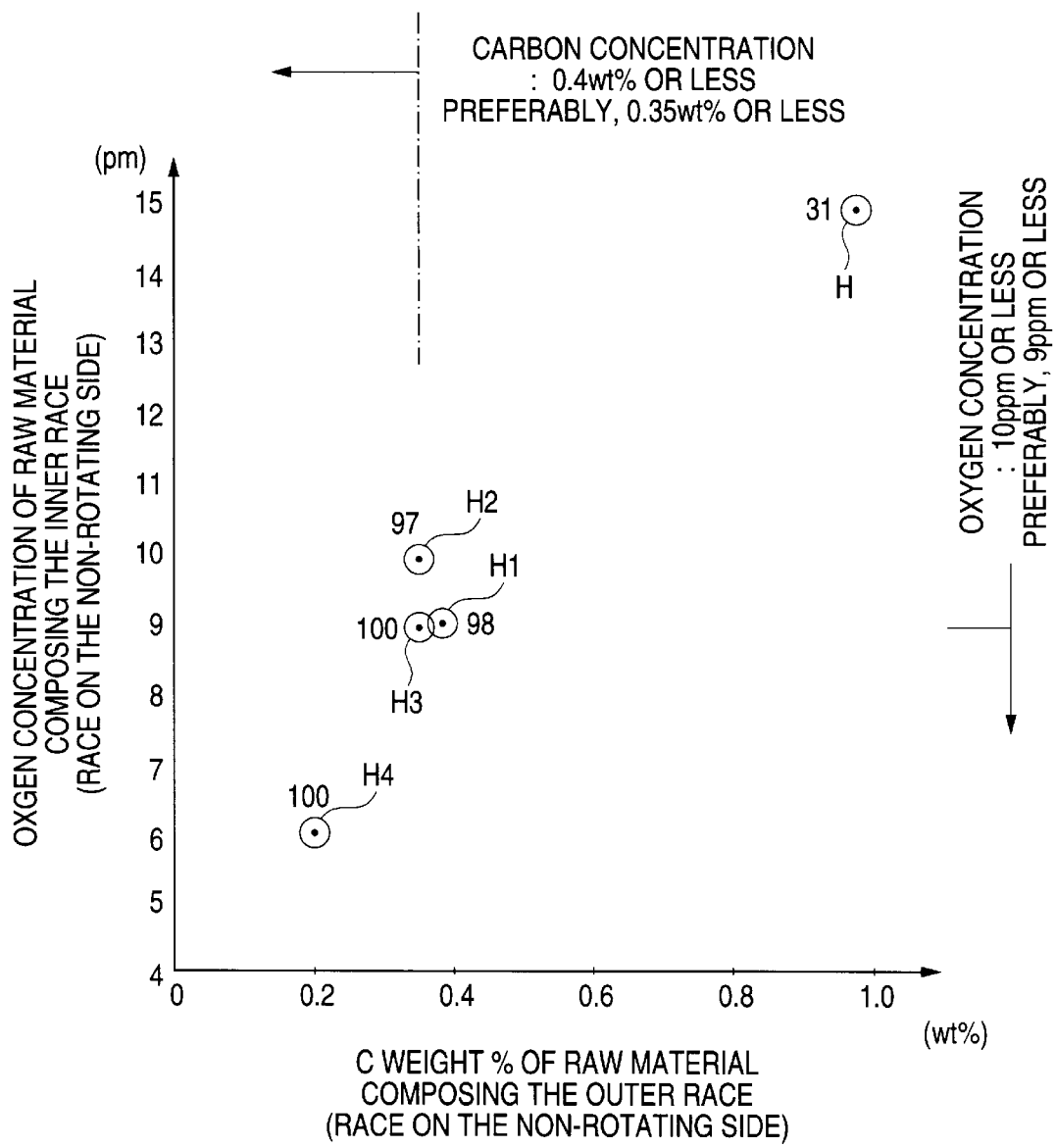
FIG. 6 shows the relation between the carbon and oxygen concentrations of the raw material composing the non-rotating side race and the life relative value in the case where $\Delta Cu_{eq.max}$ is 0.05.

Furthermore, with regard to bearings H, H1, H2, H3, H4 where $\Delta Cu_{eq.max}$ is 0.05, the relation of the carbon concentration/oxygen concentration and the life relative value of the raw material of the outer race 2 are illustrated in FIG. 6. The numeral values in FIG. 6 show the life relative values.

As is clear from FIG. 6, as the carbon concentration and oxygen concentration decline; the life relative value rises. When the carbon concentration is 0.4 weight % or less, preferably 0.35 weight % or less, and when the oxygen concentration is 10 ppm or less, preferably 9 ppm or less, the life relative value is 100, that is, the life in water-mixed grease lubricant becomes identical to the life in pure grease.

This is because hydrogen embrittlement flaking is suppressed due to the size of the residual compressive stress which is 50 MPa or more in the surface, and because the hydrogen atoms gasify and there is a reduction in the size and amount of the interposition at the sites which become the origin of hydrogen embrittlement flaking.

Thus, when the carbon concentration of the raw material composing the non-rotating side raceway is 0.4 weight % or less, and preferably 0.35 weight % or less, and when the oxygen concentration is 10 ppm or less, and preferably 9 ppm or less, hydrogen embrittlement flaking resistance is improved due to the presence of residual compressive stress of 50 MPa or more on the raceway surface, and due to the gasification of the hydrogen atoms and the reduction in the size and amount of interposition at the sites which become the origin of hydrogen embrittlement flaking. Consequently, when $\Delta Cu_{eq.max}$ is set at 0.05 or more, the life value in water-mixed grease lubricant becomes identical to the life value in pure grease.

It is a matter of course that the simultaneous implementation of reduced carbon concentration and reduced oxygen concentration in the raw material composing the non-rotating side race is effective in prolonging the life in water-mixed grease lubricant when $\Delta Cu_{eq.max}$ is 0.05 or more and less than 0.15, and that there is no influence at all when $\Delta Cu_{eq.max}$ is 0.15 or more.

In order to retard hydrogen absorption in the non-rotating side race when $\Delta Cu_{eq.max}$ is larger than 0 and less than 0.15, and in order to retard hydrogen absorption in the rotating side raceway and the rolling element when $\Delta Cu_{eq.max}$ is larger than 1.5 and less than 3.70, it is preferable to refine the grain size of the raceways and the rolling element. For this purpose, it is preferable to set the Al and N concentrations of the raw material at 0.02 weight % or more, and at 0.005 weight % or more, respectively.

Furthermore, since the carburizing time is prolonged when the carbon concentration of the raw material decreases, it is possible to prevent the extension of the carburizing time by conducting high-temperature carburizing at 960° C. or more if necessary. At such times, it is preferable to use raw material to which Nb or V of 0.05–0.20 weight % has been added.

Next, the third embodiment is explained.

With regard to the bearing reference numbers Q, U, and R shown in Table 2, this embodiment evaluated the life of bearings in water-mixed lubricant by making various changes to the combination of the retained austenite concentration on the raceway surface of the outer race, the retained austenite concentration on the raceway surface of the inner race, and the retained austenite concentration on the rolling surface of the roller.

Furthermore, outer races, inner races and rollers were separately manufactured with steel raw material of the components shown in the below Table 5, and bearings Z1–Z4 were prepared with various changes, induced by heat treatment, to the combination of the retained austenite concentration on the raceway surface of the outer race, the retained austenite concentration on the raceway surface of the inner race, and the retained austenite concentration on the rolling surface of the roller. The life of these bearings Z1–Z4 in water-mixed lubricant was then evaluated.

Here, the test conditions and test method for the third embodiment were the same as in the first embodiment.

With regard to the evaluation criteria and test results, the below Table 6 and Table 7 show for each tested bearing the retained austenite concentration on the raceway surface and rolling surface, the heat treatment method, the life relative value, etc. The life relative value uses the same definition as the life relative value in the first embodiment.

TABLE 5

| | Composition | | | | | | | | | | | | |
|---|---|---|---|---|---|---|---|---|---|---|---|---|---|
| Element | C | Si | Mn | P | S | Ni | Cr | Mo | Cu | Al | N | O | $Cu_{eq.}$ |
| Outer Race | 0.17 | 0.25 | 1.22 | 0.011 | 0.003 | 0.01 | 1.41 | 0.30 | 0.01 | 0.042 | 0.011 | 0.0015 | 0.01 |
| Inner Race | 0.16 | 0.24 | 0.38 | 0.012 | 0.003 | 4.50 | 1.20 | 0.15 | 0.50 | 0.050 | 0.010 | 0.0014 | 1.85 |
| Roller | 0.16 | 0.24 | 0.38 | 0.012 | 0.003 | 4.50 | 1.20 | 0.15 | 0.50 | 0.050 | 0.010 | 0.0014 | 1.85 |

TABLE 6

| Bearing No. | Element | $Cu_{eq.}$ of each element (wt %) | $\gamma_R$ concentration on the surface of each elements (vol. %) | $\Delta Cu_{eq.\,max}$ (wt %) | $\Delta \gamma_{R.max}$ (vol. %) | Method of heat treatment | D (Relative value of life) |
|---|---|---|---|---|---|---|---|
| Q' | Outer Race | 0.18 | 5 | 0.15 | 3 | Oil quenching from 840° C., Tempering at 220° C. | 100 |
| | Inner Race | 0.18 | 5 | | | Oil quenching from 840° C., Tempering at 220° C. | |
| | Roller | 0.33 | 8 | | | Allowed to stand for cooling after carburizing at 930° C., Oil quenching from 840° C., Tempering at 220° C. | |
| Q1 | Outer Race | 0.18 | 5 | 0.15 | 40 | Oil quenching from 840° C., Tempering at 200° C. | 100 |
| | Inner Race | 0.18 | 5 | | | Oil quenching from 840° C., Tempering at 200° C. | |
| | Roller | 0.33 | 45 | | | Oil quenching immediately after carburizing at 930° C., Tempering at 160° C. | |
| Q2 | Outer Race | 0.18 | 5 | 0.15 | 0 | Oil quenching from 840° C., Tempering at 200° C. | 99 |
| | Inner Race | 0.18 | 5 | | | Oil quenching from 840° C., Tempering at 200° C. | |
| | Roller | 0.33 | 5 | | | Allowed to stand for cooling after carburizing at 930° C., Oil quenching from 840° C., Tempering at 240° C. | |
| U' | Outer Race | 0.57 | 20 | 0.15 | 5 | Allowed to stand for cooling after carbonitriding at 930° C., Oil quenching from 820° C., Tempering at 160° C. | 100 |
| | Inner Race | 0.57 | 25 | | | Allowed to stand for cooling after carbonitriding at 930° C., Oil quenching from 840° C., Tempering at 160° C. | |
| | Roller | 0.72 | 20 | | | Allowed to stand for cooling after carburizing at 930° C., Oil quenching from 840° C., Tempering at 160° C. | |
| U1 | Outer Race | 0.57 | 5 | 0.15 | 80 | Allowed to stand for cooling after carbonitriding at 930° C., Oil quenching from 820° C., Tempering at 230° C. | 100 |
| | Inner Race | 0.57 | 45 | | | Allowed to stand for cooling after carbonitriding at 930° C., Oil quenching from 860° C., Tempering at 160° C. | |
| | Roller | 0.72 | 45 | | | Allowed to stand for cooling after carburizing at 930° C., Oil quenching from 860° C., Tempering at 160° C. | |
| U2 | Outer Race | 0.57 | 45 | 0.15 | −40 | Allowed to stand for cooling after carbonitriding at 930° C., Oil quenching from 860° C., Tempering at 160° C. | 79 |
| | Inner Race | 0.57 | 45 | | | Allowed to stand for cooling after carbonitriding at 930° C., Oil quenching from 860° C., Tempering at 160° C. | |
| | Roller | 0.72 | 5 | | | Allowed to stand for cooling after carburizing at 930° C., Oil quenching from 840° C., Tempering at 250° C. | |
| U3 | Outer Race | 0.57 | 45 | 0.15 | −80 | Allowed to stand for cooling after carbonitriding at 930° C., Oil quenching from 860° C., Tempering at 160° C. | 60 |
| | Inner Race | 0.57 | 5 | | | Allowed to stand for cooling after carbonitriding at | |

TABLE 6-continued

| Bearing No. | Element | Cu$_{eq.}$ of each element (wt %) | $\gamma_R$ concentration on the surface of each elements (vol. %) | $\Delta$Cu$_{eq.\ max}$ (wt %) | $\Delta\gamma_{R.max}$ (vol. %) | Method of heat treatment | D (Relative value of life) |
|---|---|---|---|---|---|---|---|
| | Roller | 0.72 | 5 | | | 930° C., Oil quenching from 820° C., Tempering at 230° C. Allowed to stand for cooling after carburizing at 930° C., Oil quenching from 840° C., Tempering at 250° C. | |

TABLE 7

| Bearing No. | Element | Cu$_{eq.}$ of each element (wt %) | $\gamma_R$ concentration on the surface of each elements (vol. %) | $\Delta$Cu$_{eq.\ max}$ (wt %) | $\Delta\gamma_{R.max}$ (vol. %) | Method of heat treatment | D (Relative value of life) |
|---|---|---|---|---|---|---|---|
| R' | Outer Race | 0.02 | 25 | 1.50 | 3 | Allowed to stand for cooling after carburizing at 930° C., Oil quenching from 840° C., Tempering at 160° C. | 100 |
| | Inner Race | 0.02 | 25 | | | Allowed to stand for cooling after carburizing at 930° C., Oil quenching from 840° C., Tempering at 160° C. | |
| | Roller | 1.52 | 28 | | | Allowed to stand for cooling after carburizing at 930° C., Annealing at 660° C., Oil quenching from 820° C., Tempering at 160° C. | |
| R1 | Outer Race | 0.02 | 5 | 1.50 | 80 | Allowed to stand for cooling after carburizing at 930° C., Oil quenching from 840° C., Tempering at 240° C. | 100 |
| | Inner Race | 0.02 | 45 | | | Allowed to stand for cooling after carburizing at 930° C., Oil quenching from 880° C., Tempering at 160° C. | |
| | Roller | 1.52 | 45 | | | Allowed to stand for cooling after carburizing at 930° C., Annealing at 660° C., Oil quenching from 860° C., Tempering at 160° C. | |
| R2 | Outer Race | 0.02 | 25 | 1.50 | 0 | Allowed to stand for cooling after carburizing at 930° C., Oil quenching from 840° C., Tempering at 160° C. | 99 |
| | Inner Race | 0.02 | 25 | | | Allowed to stand for cooling after carburizing at 930° C., Oil quenching from 840° C., Tempering at 160° C. | |
| | Roller | 1.52 | 25 | | | Allowed to stand for cooling after carburizing at 930° C., Annealing at 660° C., Oil quenching from 820° C., Tempering at 180° C. | |
| R3 | Outer Race | 0.02 | 45 | 1.50 | −80 | Allowed to stand for cooling after carburizing at 930° C., Oil quenching from 880° C., Tempering at 160° C. | 59 |
| | Inner Race | 0.02 | 5 | | | Allowed to stand for cooling after carburizing at 930° C., Oil quenching from 840° C. Tempering at 240° C. | |
| | Roller | 1.52 | 5 | | | Allowed to stand for cooling after carburizing at 930° C., Annealing at 660° C., Oil quenching from 820° C., Tempering at 260° C. | |
| Z1 | Outer Race | 0.01 | 5 | 3.68 | 80 | Allowed to stand for cooling after carbonitriding at 930° C., Oil quenching from 845° C., Tempering at 240° C. | 100 |
| | Inner Race | 1.85 | 45 | | | Allowed to stand for cooling after carbonitriding at 930° C., Annealing at 660° C., Oil quenching from 860° C., Tempering at 160° C. | |
| | Roller | 1.85 | 45 | | | Allowed to stand for cooling after carburizing at 930° C., Annealing at 660° C., Oil quenching from 860° C., Tempering at 160° C. | |
| Z2 | Outer Race | 0.01 | 25 | 3.68 | 3 | Allowed to stand for cooling after carbonitriding at 930° C., Oil quenching from 845° C., Tempering at 160° C. | 100 |
| | Inner Race | 1.85 | 25 | | | Allowed to stand for cooling after carbonitriding at 930° C., Annealing at 660° C., Oil quenching from 820° C., Tempering at 180° C. | |
| | Roller | 1.85 | 28 | | | Allowed to stand for cooling after carburizing at 930° C., Annealing at 660° C., Oil quenching from 820° C., Tempering at 160° C. | |
| Z3 | Outer Race | 0.01 | 25 | 3.68 | 0 | Allowed to stand for cooling after carburizing at 930° C., Oil quenching from 845° C., Tempering at 160° C. | 99 |
| | Inner Race | 1.85 | 25 | | | Allowed to stand for cooling after carburizing at 930° C., Annealing at 660° C., Oil quenching from 820° C., Tempering at 180° C. | |
| | Roller | 1.85 | 25 | | | Allowed to stand for cooling after carburizing at 930° C., Annealing at 660° C., Oil quenching from 820° C., Tempering at 180° C. | |
| Z4 | Outer Race | 0.01 | 45 | 3.68 | −80 | Allowed to stand for cooling after carbonitriding at 930° C., Oil quenching from 885° C., Tempering at 160° C. | 60 |
| | Inner Race | 1.85 | 5 | | | Allowed to stand for cooling after carbonitriding at 930° C., Annealing at 660° C., Oil quenching from 820° C., Tempering at 260° C. | |

TABLE 7-continued

| Bearing No. | Element | $Cu_{eg.}$ of each element (wt %) | $\gamma_R$ concentration on the surface of each elements (vol. %) | $\Delta Cu_{eq.\,max}$ (wt %) | $\Delta\gamma_{R.max}$ (vol. %) | Method of heat treatment | D (Relative value of life) |
|---|---|---|---|---|---|---|---|
| | Roller | 1.85 | 5 | | | Allowed to stand for cooling after carburizing at 930° C., Annealing at 660° C., Oil quenching from 820° C., Tempering at 260° C. | |

Here, in Table 6, $\gamma_R$ concentration expresses the retained austenite concentration on each surface, while $\Delta\gamma_{R.max}$ is the relative value of the retained austenite concentration between the raceway surface of the rotating side race (inner race) and the rolling surface of the roller, and the raceway surface of the non-rotating side race (outer race), and is given by the below formula.

$\Delta\gamma_{R.max}=(\gamma_R$ concentration of raceway surface of inner race$)+(\gamma_R$ concentration of rolling surface of roller$)-2\times(\gamma_R$ concentration of raceway surface of outer race$)$ Here, the factors which determine the retained austenite concentration of the raceway surfaces and the rolling surface are primarily the below-stated (1)–(5), and it is possible to set the retained austenite concentration at the desired level primarily by adjusting these factors.

(1) Martensitic transformation starting temperature (Ms point)

The lower this Ms point is, the higher is the retained austenite concentration.

Here, the martensitic transformation starting temperature (Ms point) is determined by the chemical components of the steel raw material, the carbon and nitrogen concentrations imparted by carburizing and carbonitriding, the metallic structure prior to hardening treatment, and the temperature and holding time of the hardening treatment.

For example, the retained austenite concentration respectively increases as Mn concentration in the steel raw material rises, as the carbon, etc., imparted by carburizing, etc., grows in quantity, in terms of the metallic structure prior to hardening treatment, as the already carburized retained austenite concentration becomes higher or the carbide diameter becomes smaller, as the hardening treatment temperature rises, and as the hardening treatment holding time prolongs.

(2) Cooling rate during hardening

As this cooling rate is low, the retained austenite concentration increases.

(3) Temperature and holding time of hardening-and-tempering treatment

As the treatment temperature is lowered, or as the holding time is shortened, the retained austenite concentration increases.

(4) Subzero treatment

The retained austenite concentration increases as the temperature of this treatment is raised, as its holding time is shortened, and further, when subzero treatment is not conducted.

(5) Shot peening which causes stress-induced transformation in the retained austenite and the martensite When this shot peening is not conducted, it becomes higher.

If studies are made on the life relative values of the various bearings shown in Table 6 and Table 7, it is clear that when the $\Delta\gamma_{R.max}$ value (the unit is volume %) becomes 0 or less, the life relative value cannot maintain 100, while when it is 3 or more, the life relative value can maintain 100 without fail.

That is, when the life of bearings in water-mixed lubricant is evaluated from the relative value of the retained austenite concentration, it is clear that in order to keep the life relative value at 100, the $\Delta\gamma_{R.max}$ value should be set at a value larger than 0, and in order to keep the life relative value at 100 without fail, it is preferable to set $\Delta\gamma_{R.max}$ at 3 or more.

Accordingly, if the study results of the first embodiment and the second embodiment are taken into consideration, under conditions where water becomes mixed with the lubricant, it is preferable to set $\Delta Cu_{eq.max}$ at 0.15 or more and $\Delta\gamma_{R.max}$ at 3 or more.

Here, with respect to the maximum value of $\Delta Cu_{eq.max}$, since the upper limits of the Ni concentration and Cu concentration of the steel raw material according to the present invention are respectively 4.5 weight % and 0.5 weight %, the maximum value of $\Delta Cu_{eq.max}$ becomes 3.70.

Moreover, with respect to the maximum value of $\Delta\gamma_{R.max}$, since it is necessary for the retained austenite concentration of the raceway surfaces and the rolling surface to be within the range of 5–45 volume %, the maximum value of $\Delta\gamma_{R.max}$ becomes 45+45−2×5=80.

Figure 7:
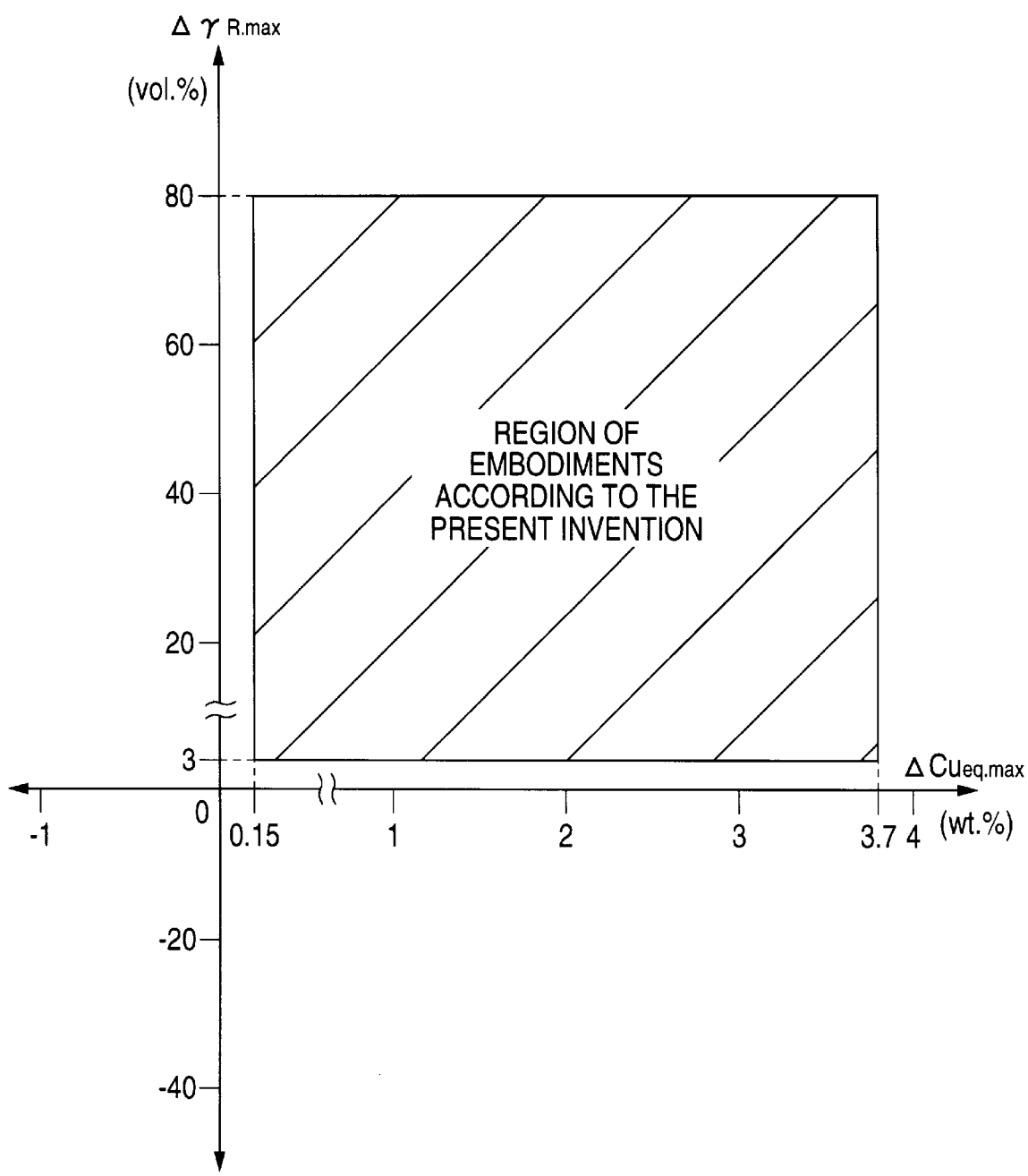
FIG. 7 shows a range in which the life relative value can be maintained at 100 in the relation between $\Delta Cu_{eq.max}$ and $\Delta \gamma_{R.max}$.

Accordingly, with respect to the relation between $\Delta Cu_{eq.max}$ and $\Delta\gamma_{R.max}$, the range within which the life relative value can be maintained at 100 is shown by the diagonally lined portion in the rectangular box of FIG. 7.

That is, the region where $\Delta Cu_{eq.max}$ is 0.15–3.70 and $\Delta\gamma_{R.max}$ is 3–80 is the region where the life relative value is 100, and this range is the desired range for the present invention.

When the retained austenite concentration of the race surfaces and the rolling surface becomes less than 5 volume % there is a remarkable decline in life in the case where impurities such as iron powder, etc., become mixed with the lubricant. When the retained austenite concentration of the raceway surfaces and the rolling surface exceeds 45 volume %, the hardness falls beneath the required hardness HRC 58. Therefore, as stated above, it is necessary to set the retained austenite concentration of the raceway surfaces and the rolling surface at 5–45 volume %.

In the case of through hardening, in order to prevent the occurrence of cracking, it is preferable to set the upper limit of the retained austenite concentration at 15 volume %.

Moreover, with respect to the raceway surfaces and the rolling surface of the outer race, inner race and roller which have undergone carburizing treatment, it is preferable to set the carbon concentration at 0.8–1.1 weight %. This is because, when the carbon concentration is less than 0.8 weight %, there is a remarkable decline in rolling fatigue strength (rolling life), and when it exceeds 1.1 weight %, rough carbides are produced in the chamfer (angle) portion of the parts, leading to a remarkable decline in impact resistance.

With respect to the raceway surfaces and the rolling surface of the outer race, inner race and roller which have undergone carbonitriding treatment, it is preferable to set the carbon concentration at 0.8–1.1 weight %, and the nitrogen concentration at 0.05–0.3 weight %. In the case of the carbon concentration range, this is for the same reason as the aforementioned carburizing treatment. When the nitrogen concentration exceeds 0.3 weight %, the retained austenite concentration tends to exceed 45 volume %, and when it is less than 0.05 weight %, the carbonitriding effect, that is, the effect of increasing the retained austenite concentration, is lost. For these reasons, the values of the aforementioned ranges have been set.

The hardness of the raceway surfaces and rolling surface of the respective parts is HRC 58–64. With the low alloy steel according to the present invention, the hardness of the raceway surfaces and the rolling surface is HRC 64 or less.

Next, a fourth embodiment is explained.

Among the bearings shown in Table 6 and Table 7, with respect to bearings Q', Q1, U', U1, R', R1, Z1 and Z2, the life relative value of which is 100, tests were conducted using the same tester as in the first embodiment.

The test conditions, however, partly differ from those of the first embodiment in that the tester was operated intermittently every 24 hours.

In this instance, neither water injection nor loading were carried out while the tester was stopped, but the moisture from the water injected during operation remained at the bottom of the test bearings. This residual water corrodes the electrochemically base side of the contacting portions among the roller and outer race. When operation is conducted again, the roller generates vibration with each passage along the corroded portion to thereby generate various practical problems. For example, in the case of the roll neck bearings of the work rolls of rolling mills, the plate thickness precision of the rolled material declines.

The aforementioned corrosion can be suppressed by increasing the absolute value of the Cu equivalent ($Cu_{eq.}$) of the outer race (non-rotating side raceway). What is important in this instance is that it is necessary to raise the $Cu_{eq.}$ of the outer race while $\Delta Cu_{eq.max}$ is maintained at 0.15 or more. If this is not done, as explained above, the outer race (non-rotating side race) absorbs hydrogen during operation to thereby cause premature flaking.

Here, the aforementioned corrosion and flaking was evaluated based on the vibration acceleration produced in the rotating shaft 4 (see FIG. 1) during operation. That is, vibration evaluation was conducted in the period from 240 to 264 hours after the start of testing, and when we made a relative comparison between the respective bearings based on the average values for vibration acceleration in the vertical direction produced in the rotating shaft 4 during operation, the results were as shown in Table 8. Here, the average value for vibration acceleration of bearing U' was used as the standard (=1).

TABLE 8

| Bearing No. | Vibration acceleration in the vertical direction (relative values) | $Cu_{eq.}$ of outer race (wt %) |
|---|---|---|
| Q' | 1.1 | 0.18 |
| Q1 | 1.0 | 0.18 |
| U' | 1 | 0.57 |
| U1 | 0.9 | 0.57 |
| R' | 8.1 | 0.02 |
| R1 | 8.3 | 0.02 |
| Z1 | 8.4 | 0.01 |
| Z2 | 8.0 | 0.01 |

As is clear from Table 8, the vibration acceleration in bearings R', R1, Z1 and Z2 whose outer race $Cu_{eq.}$ is 0.01 or 0.02 is approximately 8 times as large as the vibration acceleration in bearings Q', Q1, U' and U1 whose outer race $Cu_{eq.}$ is 0.18 or more. On the other hand, there is no difference between the vibration acceleration in bearings Q' and Q whose outer race $Cu_{eq.}$ is 0.18, and the vibration acceleration of bearings U' and U1 whose outer race $Cu_{eq.}$ is 0.57.

In general, bearings are operated intermittently as in this embodiment, and in the case where the outer race is the non-rotating side race, it is clearly preferable from the viewpoint of bearing durable life to set the outer race $Cu_{eq.}$ at 0.18 or more.

Furthermore, when the study of the third embodiment is incorporated, it is clearly more preferable from the viewpoint of the actual durable life of bearings in water-mixed lubricant to have $\Delta Cu_{eq.max} \geq 0.15$, $\Delta \gamma_{R.max} \geq 3$, and $Cu_{eq.}$ of the non-rotating side raceway (outer race) $\geq 0.18$.

As explained above, by the simple means of adjusting the proportions of Cu and Ni in the raw material composing the races and the rolling elements, the rolling bearings according to the present invention have the effect of possessing superior durable life even when used in environments where water becomes mixed with the lubricant.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A roller bearing comprising a rotating race, a non-rotating race and rolling elements which are respectively manufactured with raw material of alloy steel containing 4.5 weight % or less of Ni, 0.50 weight % or less of Cu, 3.5 weight % or less of Cr, 1.5 weight % or less of Mo, 1.5 weight % or less of Mn, 1.1 weight % or less of C and 15 ppm or less O, wherein an average value of the Cu equivalent of said raw material composing said rotating race and said rolling elements is higher than the Cu equivalent in said raw material composing said non-rotating race, when the Cu equivalent in the raw material is defined according to the following formula:

Cu equivalent (weight %)={Cu weight % in the raw material}+ 0.3×{Ni weight % in the raw material} wherein the sum of the Cu equivalent of said raw material composing said rotating race and said rolling elements is set at a value higher, by 0.15 weight % or more, than the doubled value of the Cu equivalent of the raw material composing said non-rotating race.

2. The rolling bearing according to claim 1, in which the difference in retained austenite concentrations ($\Delta \gamma_{R.max}$) satisfying the following formula is set at a value larger than 0 volume % wherein $\Delta \gamma_{R.max}$ = (retained austenite concentration on raceway surfaces of said rotating race) +

(retained austenite concentration on rolling surfaces of said rolling elements) − 2 ×

(retained austenite concentration on raceway

-continued surfaces of said non-rotating race).

3. The rolling bearing according to claim 1, in which the difference in retained austenite concentrations ($\Delta\gamma_{R.max}$) satisfying the following formula is set at a value not less than 3 volume % wherein $\Delta\gamma_{R.max}$ = (retained austenite concentration on raceway surfaces of said rotating race) +

(retained austenite concentration on rolling surfaces of said rolling elements) − 2×

(retained austenite concentration on raceway surfaces of said non-rotating race).

4. The rolling bearing according to claim 1, in which said raw material of alloy steel is made by one of VAR method and ESR method.

5. The rolling bearing according to claim 1, in which raceway surfaces of said rotating race and said non-rotating race and rolling surfaces of said rolling elements which have undergone carburizing treatment have retained austenite concentration in the range of 5–45 volume % and the carbon concentration in the range of 0.8–1.1 weight %.

6. The rolling bearing according to claim 1, in which raceway surfaces of said rotating race and said non-rotating race and rolling surface of said rolling elements which have undergone carbonitriding treatment have retained austenite concentration in the range of 5–45 volume %, the carbon concentration in the range of 0.8–1.1 weight % and the nitrogen concentration in the range of 0.05–0.3 weight %.

* * * * *